(12) United States Patent
Ogino et al.

(10) Patent No.: US 7,079,787 B2
(45) Date of Patent: Jul. 18, 2006

(54) PARTS, AND PART SUPPLYING METHODS

(75) Inventors: Hiroki Ogino, Shizuoka (JP); Takeshi Arimitsu, Kanagawa (JP); Yoshiyuki Batori, Shizuoka (JP); Masanari Morioka, Shizuoka (JP); Ken Kikuchi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 10/718,703

(22) Filed: Nov. 24, 2003

(65) Prior Publication Data

US 2004/0117970 A1 Jun. 24, 2004

(30) Foreign Application Priority Data

Nov. 29, 2002 (JP) .............................. 2002-346634

(51) Int. Cl.
*B23Q 3/00* (2006.01)
*G03G 21/16* (2006.01)

(52) U.S. Cl. ........................... 399/111; 399/107; 29/464

(58) Field of Classification Search .................. 29/464; 399/111, 107, 109, 411; 446/102
See application file for complete search history.

(56) References Cited

U.S. PATENT DOCUMENTS

| | | | |
|---|---|---|---|
| 5,638,161 A | 6/1997 | Numagami et al. | 399/111 |
| 5,911,096 A | 6/1999 | Batori et al. | 399/111 |
| 5,920,753 A | 7/1999 | Sasaki et al. | 399/111 |
| 5,930,562 A | 7/1999 | Noda et al. | 399/114 |
| 5,937,237 A | 8/1999 | Nonaka et al. | 399/106 |
| 5,940,658 A | 8/1999 | Yokoi et al. | 399/119 |
| 5,946,531 A | 8/1999 | Miura et al. | 399/111 |
| 6,002,896 A | 12/1999 | Miyamoto et al. | 399/114 |
| 6,055,406 A | 4/2000 | Kawai et al. | 399/360 |
| 6,061,538 A | 5/2000 | Arimitsu et al. | 399/111 |
| 6,075,957 A | 6/2000 | Batori et al. | 399/114 |
| 6,101,348 A | 8/2000 | Nonaka et al. | 399/103 |
| 6,131,007 A | 10/2000 | Yamaguchi et al. | 399/256 |
| 6,163,665 A | 12/2000 | Watanabe et al. | 399/111 |
| 6,246,849 B1 | 6/2001 | Yokoyama et al. | 399/117 |
| 6,275,668 B1 | 8/2001 | Batori | 399/90 |

(Continued)

FOREIGN PATENT DOCUMENTS

JP 5-154589 A 6/1993

(Continued)

OTHER PUBLICATIONS

Marked up copy of Skov et al. (Des. 373,605).*

*Primary Examiner*—Arthur T. Grimley
*Assistant Examiner*—Ryan Gleitz
(74) *Attorney, Agent, or Firm*—Fitzpatrick, Cella, Harper & Scinto

(57) ABSTRACT

A part is capable of being retained in a guide for retaining a plurality of such parts in such a manner so as to stack the parts in a direction in which gravity act on the parts and supplying parts to a predetermined position. The part has a plurality of abutment portions which come into abutment with an upper-side part in the guide and support the upper-side part, and a plurality of receiving portions with which a plurality of abutment portions provided on a lower-side part in the guide are brought into abutment. The center of gravity of the part is disposed inside a region surrounded by the plurality of abutment portions. Accordingly, it is possible to convey parts to an assembly line without causing damage to the regions of the parts that are required to have dimensional precision.

1 Claim, 34 Drawing Sheets

U.S. PATENT DOCUMENTS

| | | | |
|---|---|---|---|
| 6,282,390 B1 | 8/2001 | Miyabe et al. | 399/111 |
| 6,334,035 B1 | 12/2001 | Abe et al. | 399/106 |
| 6,351,620 B1 | 2/2002 | Miyabe et al. | 399/111 |
| 6,363,226 B1 | 3/2002 | Batori | 399/8 |
| 6,459,869 B1 | 10/2002 | Nittani et al. | 399/111 |
| 6,463,234 B1 | 10/2002 | Arimitsu et al. | 399/113 |
| 6,685,025 B1 * | 2/2004 | Kari | 206/583 |
| 2002/0110388 A1 | 8/2002 | Yokomori et al. | 399/167 |
| 2002/0122672 A1 | 9/2002 | Sasago et al. | 399/12 |
| 2002/0159779 A1 | 10/2002 | Morioka et al. | 399/27 |
| 2002/0161654 A1 | 10/2002 | Uetake et al. | 705/22 |
| 2003/0086715 A1 | 5/2003 | Miura et al. | 399/27 |
| 2003/0108358 A1 | 6/2003 | Yokoi et al. | 399/109 |
| 2003/0156856 A1 | 8/2003 | Arimitsu et al. | 399/114 |
| 2003/0170061 A1 | 9/2003 | Ito | 400/472 |
| 2003/0185587 A1 | 10/2003 | Kawai et al. | 399/111 |

FOREIGN PATENT DOCUMENTS

| | | |
|---|---|---|
| JP | 10-010452 A | 1/1998 |
| JP | 10-20744 A | 1/1998 |
| JP | 10-105025 A | 4/1998 |
| JP | 2001-130668 A | 5/2001 |

* cited by examiner

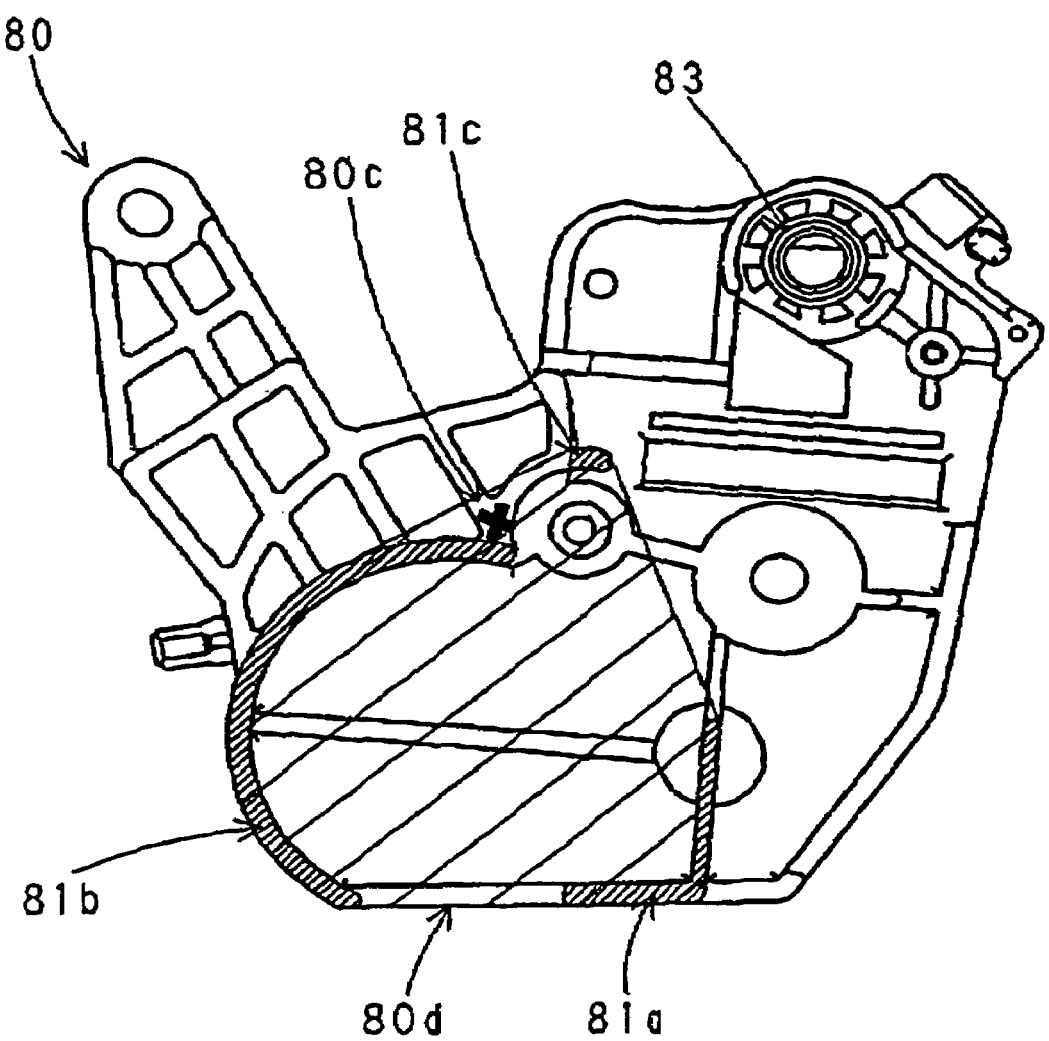

90

PARTS, AND PART SUPPLYING METHODS

BACKGROUND OF THE INVENTION

1. Field of the Invention

The present invention relates to parts and part supplying methods. The term "part(s)" used herein means a part(s) which constitutes, for example, a process cartridge required to have dimensional precision and removably fitted into a main body of an electrophotographic image forming apparatus.

2. Description of the Related Art

An image forming apparatus such as a printer using electrophotographic techniques forms a latent image on a uniformly charged photosensitive drum (or electrophotographic photosensitive member) by selective exposure, develops this latent image by toner, and transfers a toner image to a recording medium, thereby effecting recording of an image.

Such an apparatus makes use of a cartridge in which the photosensitive drum, a charger, a developer, a cleaning member and the like are assembled into an integral structure. Accordingly, a user can supply toner or replace a photosensitive drum part which has reached its lifetime, merely by loading a new cartridge into the main body of the apparatus in place of an old cartridge, whereby the user can easily perform maintenance.

The housing of the above-described cartridge is constructed by connecting together a plurality of frames such as a developing frame for supporting the developer and a cleaning frame for supporting the cleaning member.

Many of the cartridge parts necessary for the assembly of the cartridge are classified by the kinds of parts and are randomly boxed in a production factory, or to avoid damage to parts due to contact therebetween, the cartridge parts are individually placed into separate containers and are boxed. Such cartridge parts are conveyed to an assembly line. In the case where the cartridge parts are supplied to an automatic cartridge assembly machine, a device (a parts feeder) is used to make uniform the direction of arrangement of the cartridge parts or the positional relationship between the obverse and reverse side of each of the cartridge parts.

SUMMARY OF THE INVENTION

An object of the invention is to provide an arrangement for easily and reliably supplying parts to an assembly process without causing damage to the areas of the parts that are required to have dimensional precision, the parts being used in an assembly process for products each made of a plurality of parts, for example, an assembly process for process cartridges.

Another object of the invention is to provide an arrangement capable of moving a part in a part arranging direction without changing the attitude of the part.

Another object of the invention is to provide an arrangement for supplying parts to an assembly process without causing damage to the areas of the parts that are required to have dimensional precision, the parts being used in an assembly process for products each made of a plurality of parts, for example, an assembly process for process cartridges.

Another object of the invention is to provide a part capable of being retained in a guide for retaining a plurality of parts in such a manner as to stack the parts in a gravitational direction, and to supply the parts to a predetermined position. The part includes:

a plurality of abutment portions which come into abutment with an upper-side part in the guide and support the upper-side part; and a plurality of receiving portions with which a plurality of abutment portions provided on a lower-side part in the guide are brought into abutment, the abutment portions and the corresponding receiving portions being disposed on straight lines parallel with a part arranging direction, a center of gravity of the part being disposed inside a region surrounded by the plurality of abutment portions, lengths between abutment locations at which the respective abutment portions come into abutment with an upper-side part and receiving locations at which the receiving portions corresponding to the respective abutment portions come into abutment with a lower-side part being substantially the same for any of the abutment portions.

Another object of the invention is to provide a part supplying method of retaining a plurality of parts in the state of stacking the parts in a guide in the gravitational direction, and supplying the plurality of parts to a predetermined position.

The part supplying method includes; a part inserting step of inserting a part into the guide from above in an attitude having a predetermined range of inclination with respect to an orderly arranged attitude;

a gravitational-direction positioning step of bringing the inserted part into abutment with a first abutment portion provided on a preceding part, and positioning the part in the gravitational direction;

an inclination correcting step of correcting an inclination of the inserted part to arrange the inserted part in a column, by allowing a center-of-gravity side of the inserted part to fall while moving downward about the first abutment portion, and bringing the center-of-gravity side into abutment with a second abutment portion provided on the preceding part; and an arranged-parts supplying step of supplying the arranged parts to a predetermined position in the same attitude.

BRIEF DESCRIPTION OF THE DRAWINGS

FIGS. 18A and 18B are, respectively, a top plan view and a perspective view of an end member according to the embodiment of the invention;

DESCRIPTION OF THE PREFERRED EMBODIMENTS

A preferred embodiment of this invention will be described below in illustrative detail with reference to the accompanying drawings. In the following description, unless otherwise specified, the dimensions, materials, shapes and relative positions and the like of constituent parts of the embodiment to be described below are shown by way of illustration only, and are not intended to restrict the scope of the invention. In addition, the materials, shapes and the like of members which will be described later in order are assumed to be the same throughout the entire description, unless otherwise specified.

In the following description, the longitudinal direction of a process cartridge is a direction which intersects (approximately perpendicularly) the direction in which the process cartridge is to be removably loaded into a main body of an image forming apparatus (the axial direction of an image bearing member), is parallel with a surface of a recording medium and intersects (approximately perpendicularly) the transporting direction of the recording medium. The terms "right" and "left" used herein represent the right side and the left side of the recording medium which is viewed from the top side thereof in the transporting direction of the recording medium. The top surface of the process cartridge is a surface to be positioned on the top side during the state in which the process cartridge is loaded in the main body of the apparatus, while the bottom surface of the process cartridge is a surface to be positioned on the bottom side during that state.

(Description of Entire Construction of Electrophotographic Image Forming Apparatus)

Figure 1:
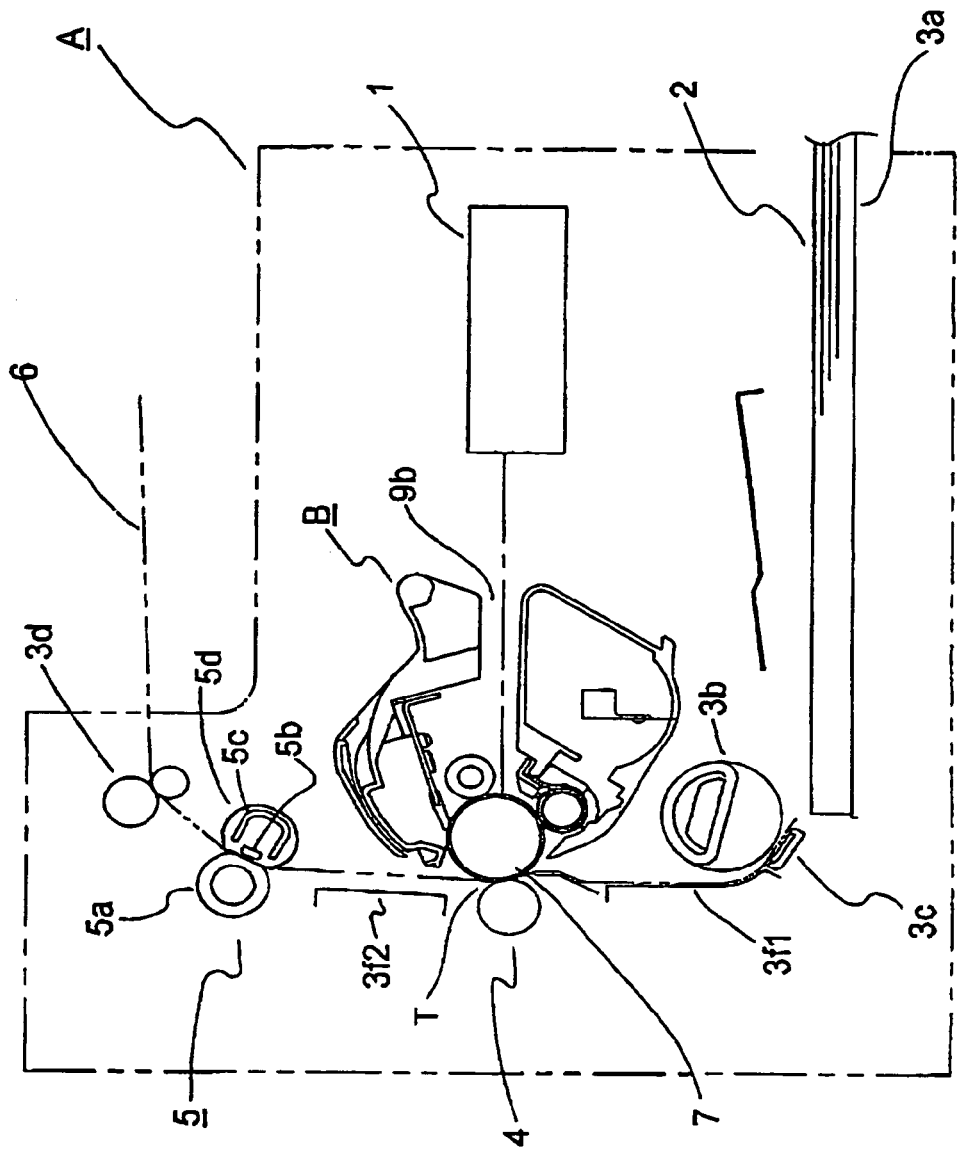
FIG. 1 is a schematic cross-sectional view of an electrophotographic image forming apparatus according to an embodiment of the invention.

First of all, the entire construction of an electrophotographic image forming apparatus (hereinafter referred to as the "image forming apparatus") will be schematically described below with reference to FIG. 1. FIG. 1 is a schematic cross-sectional view of the image forming apparatus in which a process cartridge according to this embodiment is mounted. More specifically, FIG. 1 is a schematic cross-sectional view of a laser beam printer which is one form of the image forming apparatus.

As shown in FIG. 1, an image forming apparatus (laser beam printer) A according to this embodiment irradiates information light based on image information from an optical system 1 serving as optical means onto a drum-shaped electrophotographic photosensitive member (or image bearing member, hereinafter referred to as the "photosensitive drum") 7, thereby forming an electrostatic latent image on the photosensitive drum 7. This electrostatic latent image is developed with a developer (hereafter referred to as "toner") to form a toner image. In synchronism with the formation of the toner image, recording media 2 (for example, recording paper, OHP sheets, and pieces of cloth) are fed from a cassette 3a on a sheet by sheet basis by means of a pickup roller 3b and a pressure member 3c which is in pressure contact with the pickup roller 3b.

One recording medium 2 fed in this manner is transported along a transport guide 3f1 to a transfer section T in which the photosensitive drum 7 incorporated in a process cartridge B and a transfer roller 4 serving as transfer means are opposed to each other.

The toner image formed on the photosensitive drum 7 is transferred to the recording medium 2 transported to the transfer section T, by the transfer roller 4 to which a voltage is applied, and the recording medium 2 is transported to fixing means 5 along a transport guide 3f2.

The fixing means 5 includes a driving roller 5a and a fixing rotary body 5d constructed with a cylindrical sheet which contains a heater 5b and is rotatably supported by a support 5c, and applies heat and pressure to the recording medium 2 which is passing through the fixing means 5, thereby fixing the transferred toner image.

A discharge roller 3d transports the recording medium 2 having the fixed toner image, and discharges the recording medium 2 to a discharge section 6 through a reverse transport path. Incidentally, in this embodiment, transport means 3 is constructed of the pickup roller 3b, the pressure member 3c, the discharge roller 3d, and the like.

(Process Cartridge)

Figure 2:
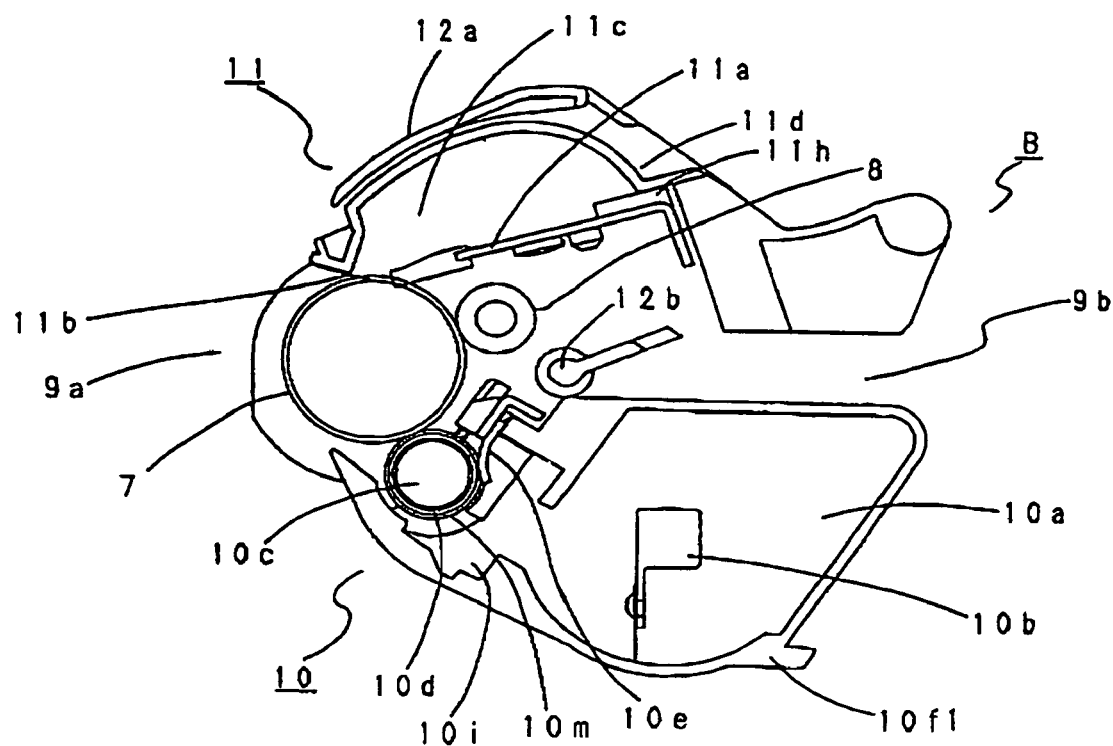
FIG. 2 is a schematic cross-sectional view of a process cartridge according to the embodiment of the invention.

The entire construction of the process cartridge B will be schematically described below with reference to FIG. 2. FIG. 2 is a schematic cross-sectional view of the process cartridge B according to this embodiment.

As shown in FIG. 2, the process cartridge B is provided with the photosensitive drum and at least one process means. The process means includes, for example, charging means for electrically charging the photosensitive drum, developing means for developing an electrostatic latent image formed on the photosensitive drum, and cleaning means for cleaning toner remaining on the photosensitive drum.

In this embodiment, while the photosensitive drum 7 having a photosensitive layer is being rotated, a voltage is applied to a charging roller 8 which serves as charging means, to uniformly charge the surface of the photosensitive drum 7. Then, this electrically charged photosensitive drum 7 is exposed to information light (a light image) based on image information sent from the optical system 1, through an exposure opening 9b. In this manner, an electrostatic latent image is formed on the surface of the photosensitive drum 7, and the electrostatic latent image is developed by a developing unit 10.

The developing unit 10 sends out toner contained in a toner chamber 10a which serves as a toner accommodating portion, by means of a rotatable toner feeding member 10b. Then, while a developing roller 10d which is a developing rotary body (or developer bearing member) containing a stationary magnet 10c is being rotated, a toner layer to which frictionally electrified charge has been given by a developing blade 10e is formed on the surface of the developing roller 10d. Then, this toner is transferred to the photosensitive drum 7 according to the electrostatic latent image. In this manner, a toner image is formed on the photosensitive drum 7 as a visible image.

Then, a voltage which is of opposite polarity to the polarity of the toner image is applied to the transfer roller 4 to transfer the toner image to the recording medium 2. After that, the toner remaining on the photosensitive drum 7 is scraped down by a cleaning blade 11a. Then, the scraped toner is scooped by a scooping sheet 11b, and is collected into a removed toner accommodating portion 11c. The residual toner on the photosensitive drum 7 is removed by this cleaning means.

The process cartridge B according to this embodiment includes a cleaning unit 11 which rotatably supports the photosensitive drum 7 and is made of a cleaning frame 11d in which the cleaning blade 11a and the charging roller 8 are incorporated, and the developing unit 10 made of a toner developing frame 10f1 in which the developing roller 10d and the toner chamber 10a are incorporated. The frame 10f1 is supported for turning movement with respect to the frame 11d so that the developing roller 10d can be disposed in parallel opposed relation to the photosensitive drum 7 with a predetermined space interposed therebetween. Spacers 10m which retain the space between the developing roller 10d and the photosensitive drum 7 are respectively disposed at both ends of the developing roller 10d.

End members 80 and 90 (refer to FIG. 7) are respectively provided at both ends of the frame 10f1. Each of the end members 80 and 90 has an arm portion 10g7 provided with a connecting hole 10g8 for rotatably suspending the developing unit 10 containing the developing roller 10d from the cleaning unit 11 containing the cleaning blade 11a. A predetermined pressurizing force for retaining a space is applied between the developing unit 10 and the cleaning unit 11.

(Cleaning Unit)

Figure 3:
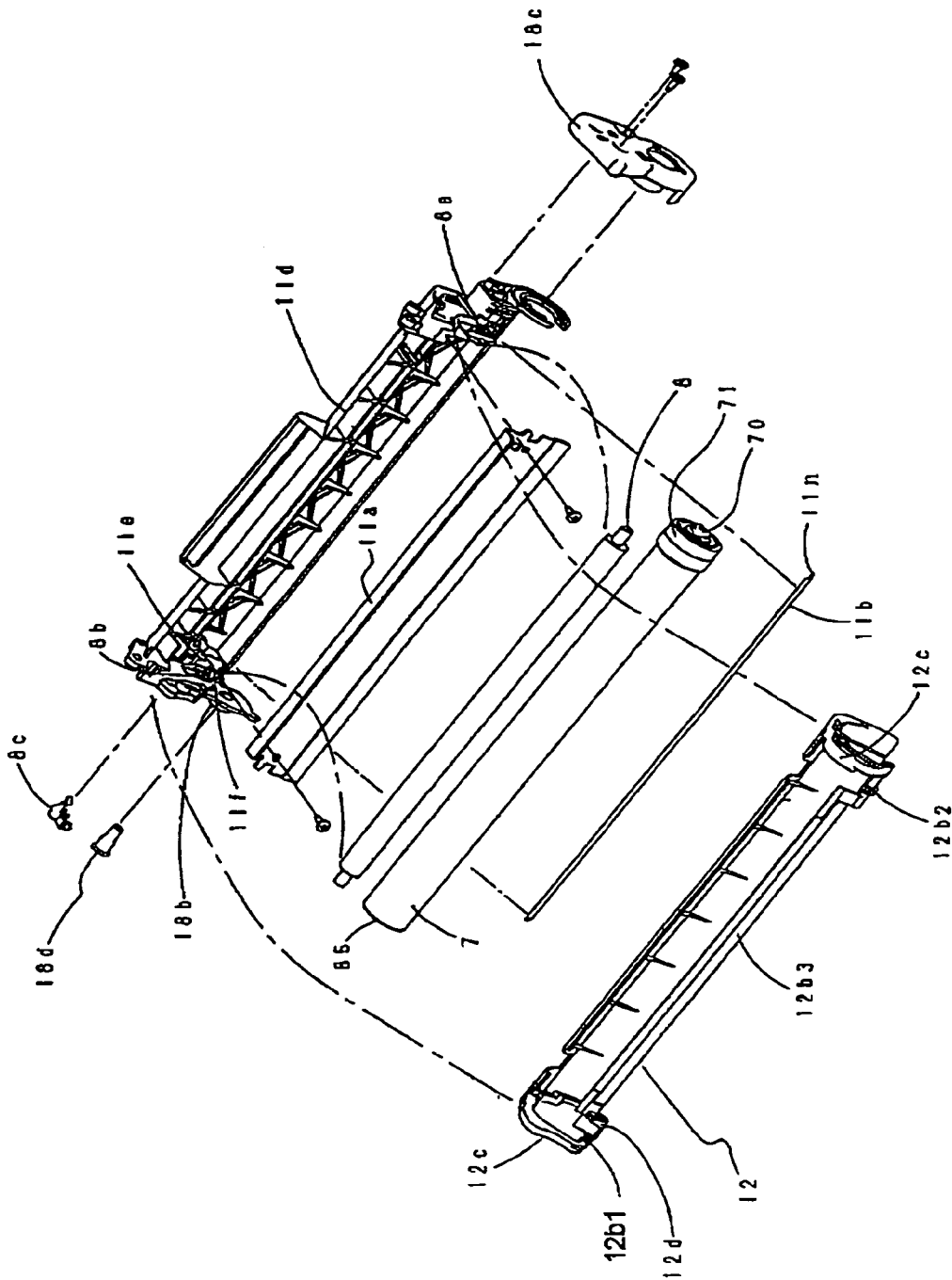
FIG. 3 is a perspective view of a cleaning unit assembly according to the embodiment of the invention.
Figure 4:
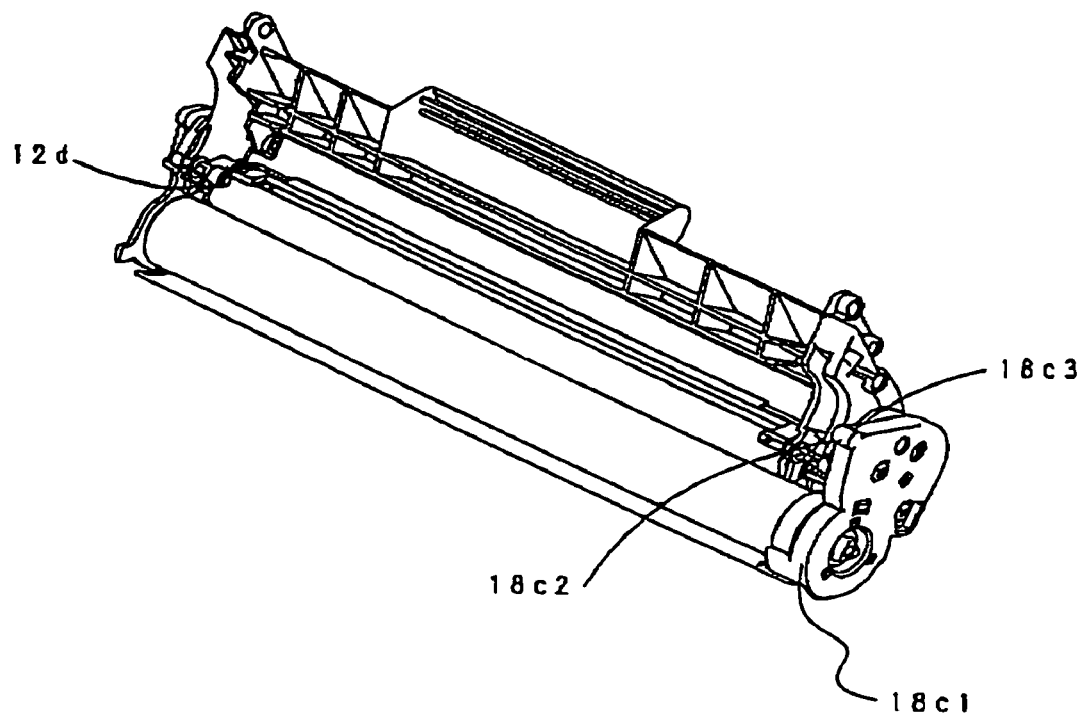
FIG. 4 is one general perspective view of the cleaning unit according to the embodiment of the invention.

The construction of the cleaning unit 11 which constitutes part of the process cartridge B will be described below in detail with reference to FIGS. 2 through 4. FIG. 3 is an assembling perspective view of the cleaning unit 11 according to this embodiment, and FIG. 4 is a general perspective view of the cleaning unit 11.

The cleaning unit 11 has the photosensitive drum 7, the charging roller 8 for electrically charging the surface of the photosensitive drum 7, the cleaning blade 11a for removing toner remaining on the surface of the photosensitive drum 7, the cleaning frame 11d to which the cleaning blade 11a is secured, a drum shutter 12 rotatably provided on the cleaning frame 11d, and a bearing member 18c for supporting the photosensitive drum 7.

A first seal member 11e is fixed to a predetermined position of the cleaning frame 11d by double sided adhesive tape or the like so that the toner accommodated in the removed toner accommodating portion 11c is prevented from leaking from the reverse side of both rubber ends of the cleaning blade 11a.

A second seal member 11f is fixed to a predetermined position of the cleaning frame 1d by double sided adhesive tape or the like so that the toner accommodated in the removed toner accommodating portion 11c is prevented from leaking from the reverse side of the cleaning blade 11a.

A third seal member 11f is fixed to a predetermined position of the cleaning frame 11d by double sided adhesive tape or the like so that the toner accommodated in the removed toner accommodating portion 11c is prevented from leaking from both rubber ends of the cleaning blade 11a, and as a member for cleaning sticking matter such as toner on the photosensitive drum 7.

The scooping sheet 11b which serves as a scooping member is fixed to the cleaning frame 11d by double sided adhesive tape 11n.

Roller bearings 8a and 8b into each of which either one of the opposite ends of the shaft portion of the charging roller 8 is to be fitted are respectively provided at both longitudinal ends of the cleaning frame 11d. In addition, an electrode 8c for supplying electricity to the charging roller 8 from the main body of the image forming apparatus A is provided on the cleaning frame 11d in the state of being kept in contact with the roller bearing 8b.

The photosensitive drum 7 is constructed as a unit in which a triangular coupling 70 serving as coupling means for transmitting driving and a drum gear assembly 71 in which a grounding contact and gears for transmitting driving to the developing roller 10d and the transfer roller 4 are connected to one end, while a flange 85 having a bearing is connected to the other end. The photosensitive drum 7 is supported by the bearing member 18c connected to the cleaning frame 11d on the side of the triangular coupling 70 by a machine screw and a positioning pin 18d which is press-fitted in a positioning portion 18b provided in the cleaning frame 11d.

The drum shutter 12 is capable of integrally covering the exposure opening 9b and a transfer opening 9a in which the photosensitive drum 7 is opposed to the transfer roller 4, and is rotatably provided on the cleaning frame 11d. The construction of the drum shutter 12 will be described below in detail.

A drum protecting portion 12a covers the transfer opening 9a in which the photosensitive drum 7 is opposed to the transfer roller 4. A rotating shaft 12b is provided on the cleaning frame 11d in the vicinity of the charging roller 8, and is provided with sliding portions 12b1 and 12b2 provided at both ends of the rotating shaft 12b for sliding movement relative to the cleaning frame 11d, and a shaft portion 12b3 which connects the sliding portions 12b1 and 12b2. Connecting portions 12c are respectively provided at two right and left locations so that both ends of the drum protecting portion 12a and the rotating shaft 12b are connected to one another at the outside of the rotating shaft 12b.

A shutter spring 12d gives an urging force to the drum shutter 12 by its springy force in the direction in which the drum shutter 12 covers the photosensitive drum 7. A rib 12e (refer to FIG. 5) is provided on the right connecting portion 12c at the outside of the rotating shaft 12b, and extends outwardly from the connecting portion 12c in the longitudinal direction of the drum shutter 12. This rib 12e is received by a shutter guide Gb9 (refer to FIG. 10) of a guide member Gb provided on the main body of the image forming apparatus A which will be described later, whereby the drum shutter 12 is retained in its open attitude.

Figure 5:
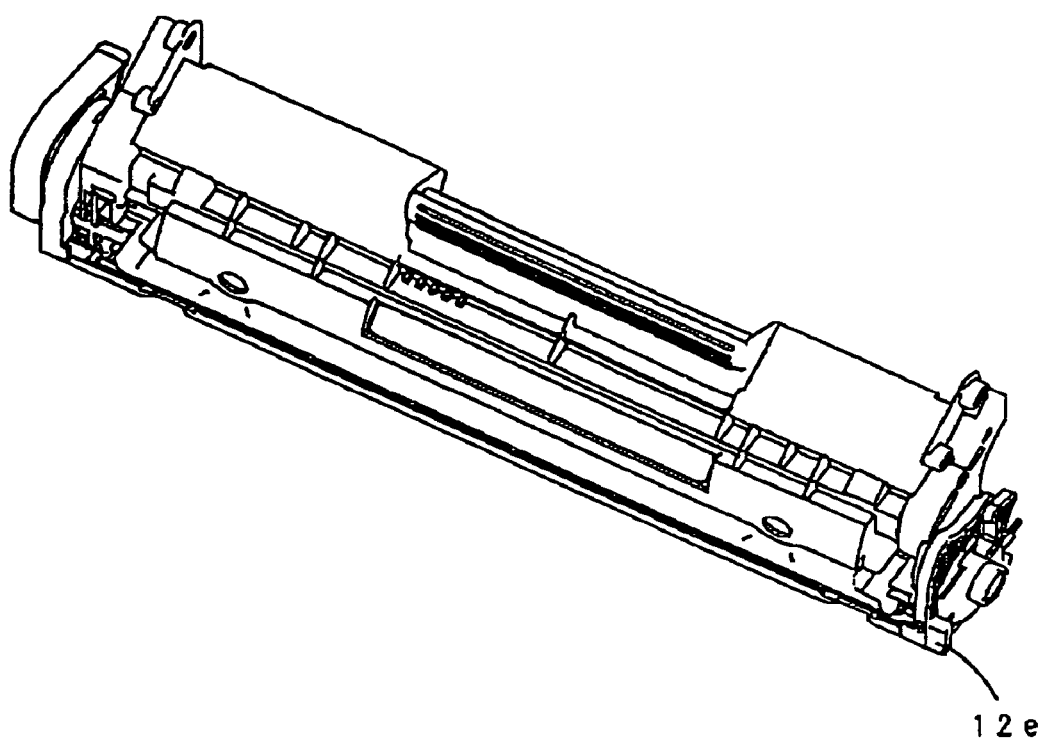
FIG. 5 is another general perspective view of the cleaning unit according to the embodiment of the invention.

When the process cartridge B is in the state of being taken out of the main body of the image forming apparatus A, the drum shutter 12 is maintained in the closed state of covering the transfer opening 9a of the photosensitive drum 7, by the springy force of the shutter spring 12d, as shown in FIGS. 4 and 5. When the process cartridge B is placed in the main body of the apparatus A in the state of being operable to form an image, the drum shutter 12 is rotated by drum shutter opening/closing means provided in the main body of the apparatus A, thereby assuming the attitude of exposing the transfer opening 9a and enabling the photosensitive drum 7 and the transfer roller 4 to abut on each other, as shown in FIGS. 1 and 2.

(Developing Unit)

Figure 6:
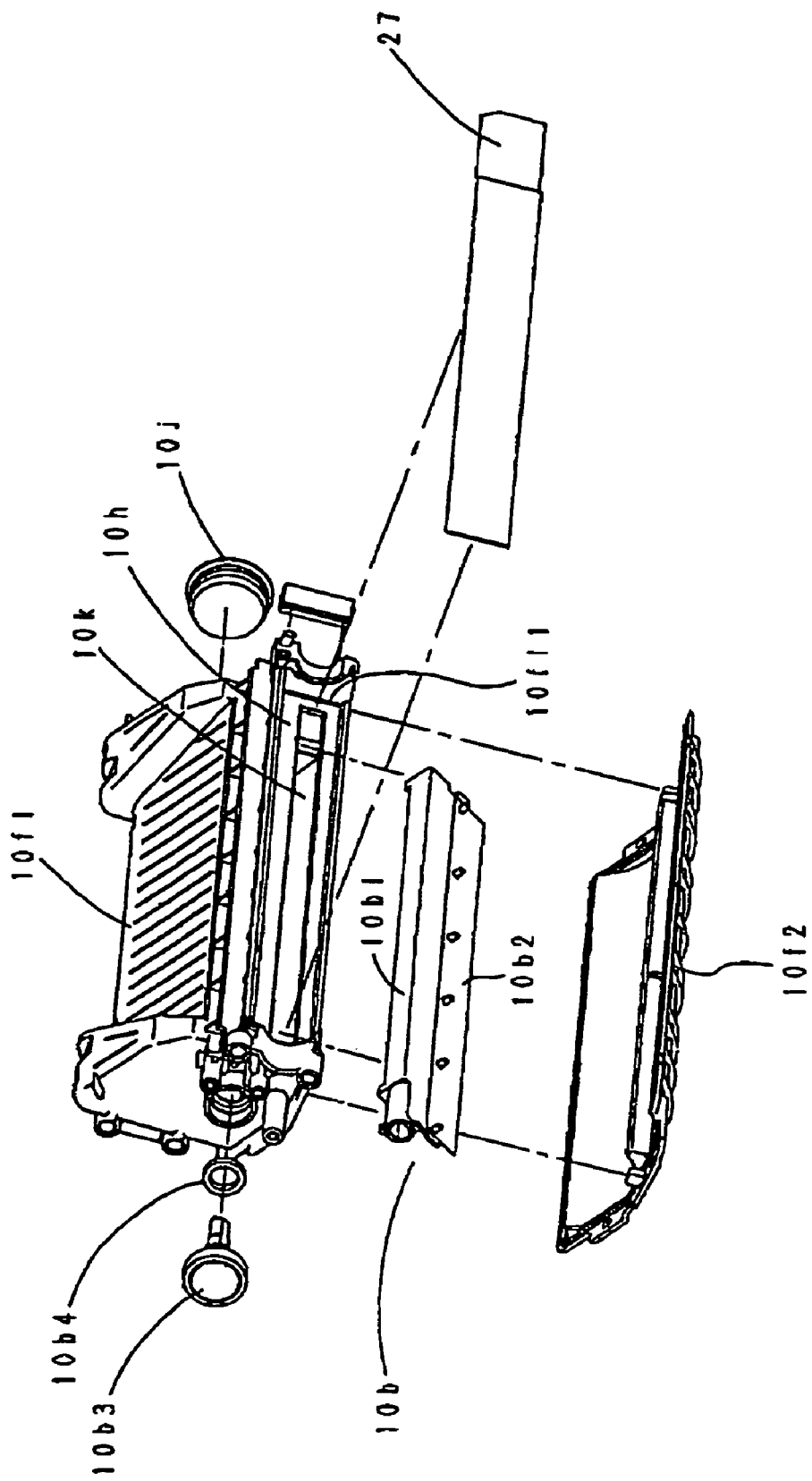
FIG. 6 is one perspective view of a developing unit assembly according to the embodiment of the invention.
Figure 7:
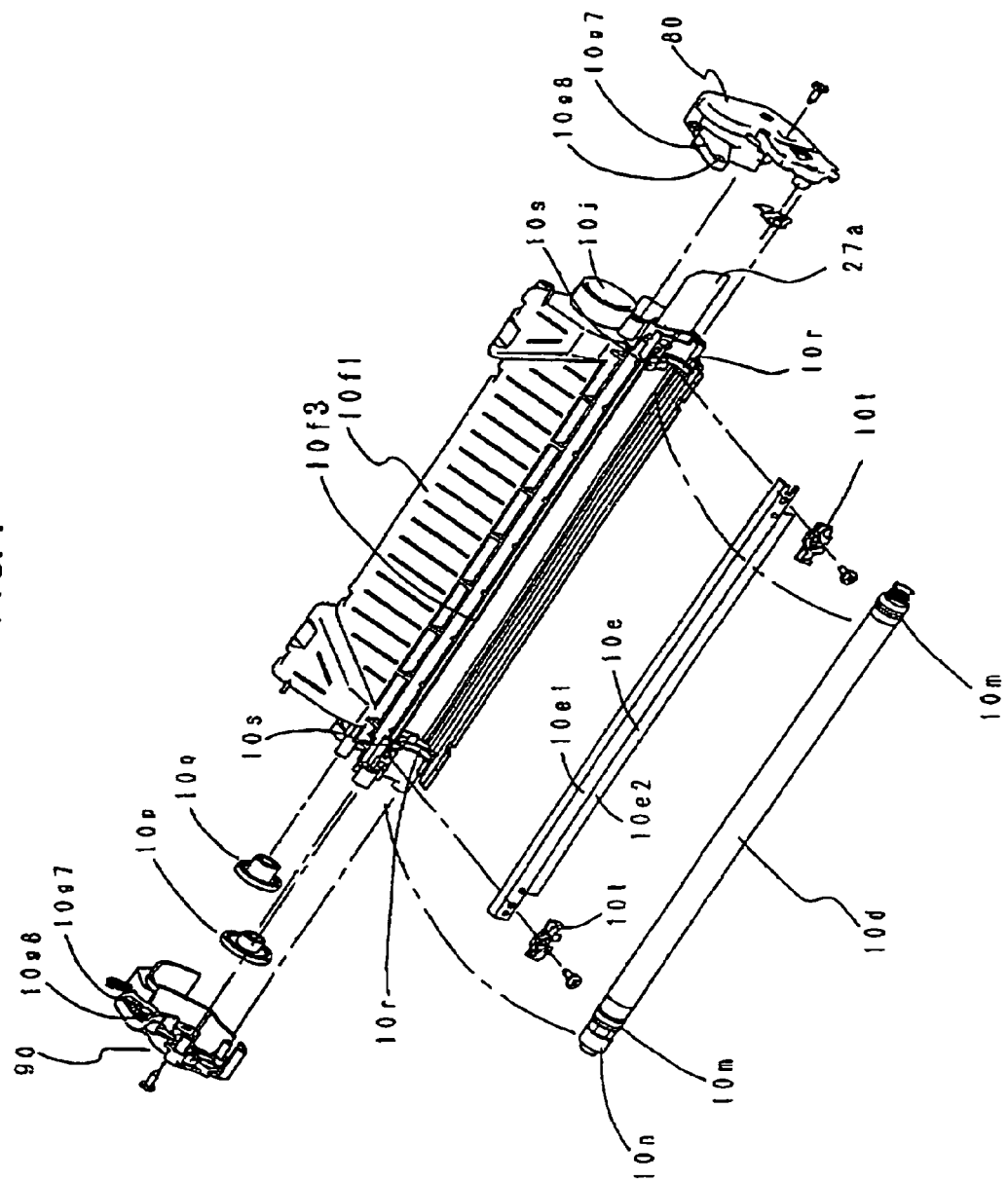
FIG. 7 is another perspective view of the developing unit assembly according to the embodiment of the invention.

The construction of the developing unit 10 which constitutes part of the cartridge B will be described below with reference to FIGS. 2, 6 and 7. FIGS. 6 and 7 are assembling perspective views of the developing unit 10 according to this embodiment.

The developing unit 10 has the toner chamber 10a and a developing chamber 10i which are defined by connecting the toner developing frame 10f1 and a lid member 10f2 as shown in FIG. 6.

The frame 10f1 contains a stirring shaft 10b1 for supplying the developer (hereinafter referred to as the toner) and a sheet member 10b2 fixed to the stirring shaft 10b1. The frame 10f1 is provided with a toner passing opening 10k through which the toner accommodated in the toner chamber 10a is supplied to the developing roller 10d.

A transport gear 10b3 restricts driving transmission and the longitudinal position of the stirring shaft 10b1, and is connected to the stirring shaft 10b1 together with a seal member 10b4 for preventing the toner from leaking from the toner developing frame 10f1.

A toner seal member 27 is thermally fixed to a seal mounting portion 10h along the four edges of the toner passing opening 10k. One longitudinal end of the frame 10f1 is provided with a toner filling port (not shown) for filling the toner chamber 10a with the toner, and the toner filling port is sealed with a cap member 10j after the toner chamber 10a has been filled with the toner.

Furthermore, as shown in FIG. 7, end seals 10r for preventing leak of toner at both ends of the developing roller 10d are secured to the frame 10f1. In addition, seal members 10s for preventing leak of toner at both ends of the developing blade 10e are stuck to the frame 10f1 and the lid member 10f2 by double sided adhesive tape or the like.

The developing blade 10e is fixed in such a manner that both ends of a sheet metal portion 10e1 are fixed to the frame 10f1 together with scraping members 10t for scraping the toner at the end portions of the developing roller 10d, by means of machine screws. A rib 10f3 formed by tapering a front edge of the frame 10f1 is set to a size which enables the rib 10f3 to surely cut into a developing blade rubber portion 10e2 at this time. Thus, the developing blade rubber portion 10e2 and the toner developing frame 10f1 are hermetically sealed.

One of the end members 80 and 90 disposed at both longitudinal ends of the developing unit 10 covers a developing roller gear 10n which is fixed to one end of the developing roller 10d meshed with a drum gear (not shown) fixed to one end of the photosensitive drum 7, and a gear train made of two idler gears 10p and 10q for transmitting driving from the developing roller gear 10n to the transport gear 10b3 of the toner feeding member 10b.

A toner seal end portion 27a of the toner seal member 27 is folded back at one longitudinal end of the toner passing opening 10k and is drawn out through a hole 10f1 (refer to FIG. 6) of the toner developing frame 10f1.

(Connection Between Developing Unit and Cleaning Unit)

Figure 8:
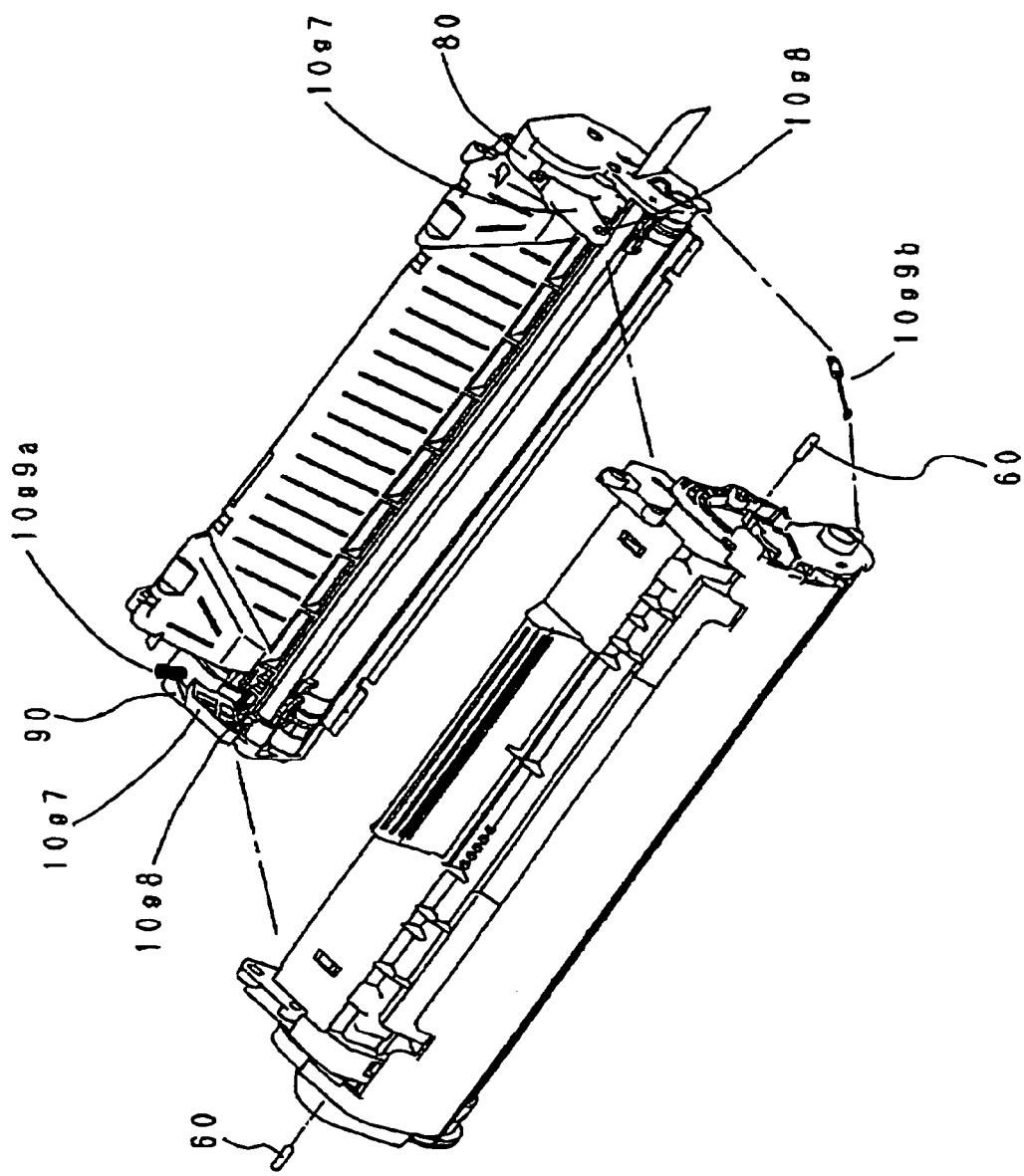
FIG. 8 is a perspective view of a process cartridge assembly according to the embodiment of the invention.
Figure 9:
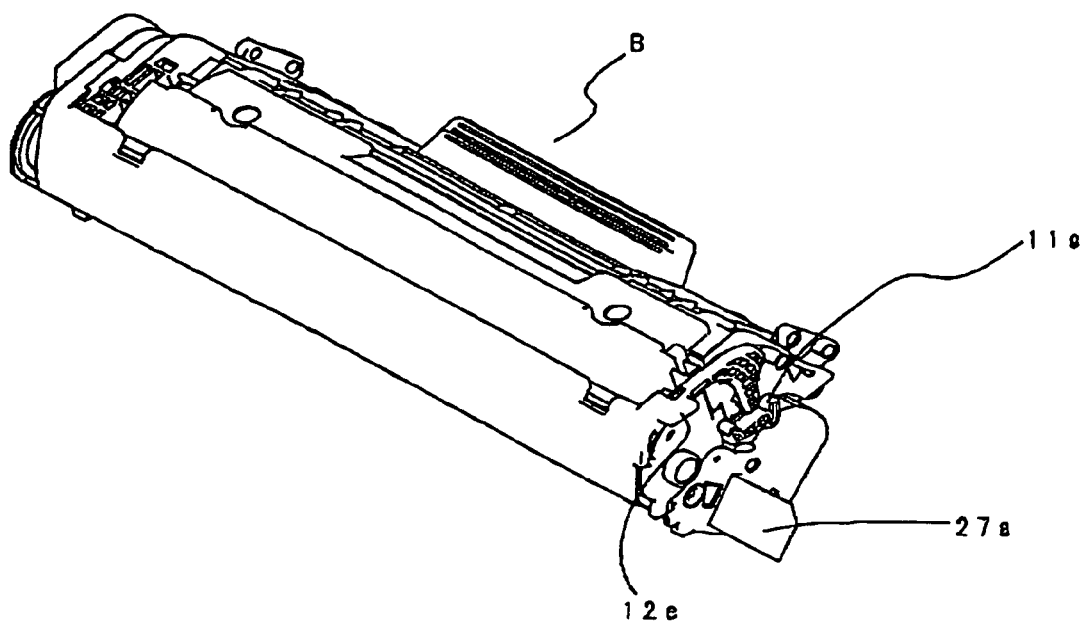
FIG. 9 is a general perspective view of the process cartridge according to the embodiment of the invention.

The assembly of the cartridge B will be described below in detail with reference to FIGS. 8 and 9. FIG. 8 is an assembling perspective view of the cartridge B according to this embodiment, and FIG. 9 is a general perspective view of the cartridge B according to this embodiment.

The cartridge B is assembled by connecting the developing unit 10 and the cleaning unit 11.

The two end members 80 and 90 disposed at both ends of the developing unit 10 are respectively provided with arm portions 10g7 which project toward the cleaning frame lid. The cleaning frame 11d and the end members 80 and 90 can be turnably connected together by longitudinal connecting holes 10g8 provided in the end portions of the respective arm portions 10g7 and pins 60 respectively fitted into connecting holes (not shown) provided in the cleaning frame 11d.

A compression coil spring 10g9a having an inside diameter fitted into a spring stopper is provided in compression between one of the end members 80 and 90 and the cleaning frame 11d. A tension spring 10g9b is passed between the other of the end members 80 and 90 and the cleaning frame 11d. Owing to this construction, the spacers 10m provided at both ends of the developing roller 10d and the photosensitive drum 7 are kept in pressure contact with each other. The developing roller 10d and the photosensitive drum 7 are retained with the predetermined spaced interposed therebetween, whereby the cartridge B is finished.

When a user is to use the cartridge B after having bought it, the user grips the toner seal end portion 27a of FIG. 9 and pulls out the toner seal member 27. In this manner, the toner passing opening 10k of the frame 10f1 is opened so that the toner can be fed from the toner chamber 10a to the developing chamber 110i. Thus, preparations for inserting the cartridge B into the main body of the apparatus A are completed.

(Loading and Unloading of Process Cartridge into and from Main Body of Image Forming Apparatus)

Figure 10:
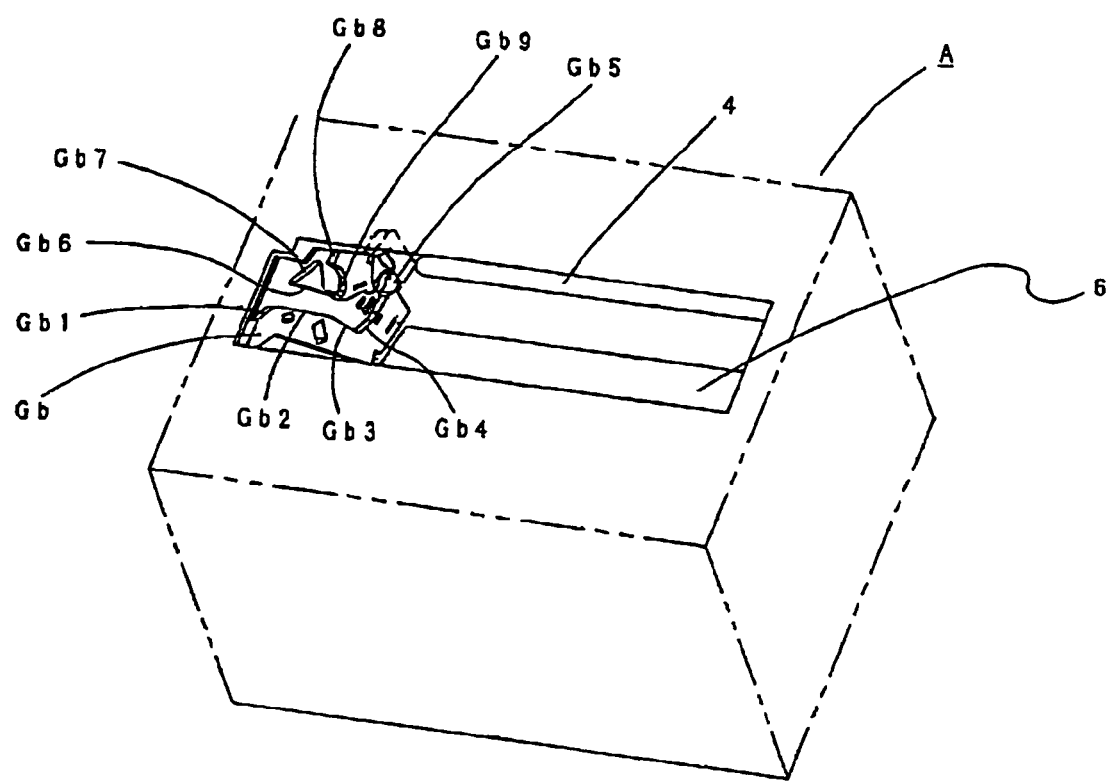
FIG. 10 is a schematic perspective view of a left guide provided on a main body of an image forming apparatus according to the embodiment of the invention.
Figure 11:
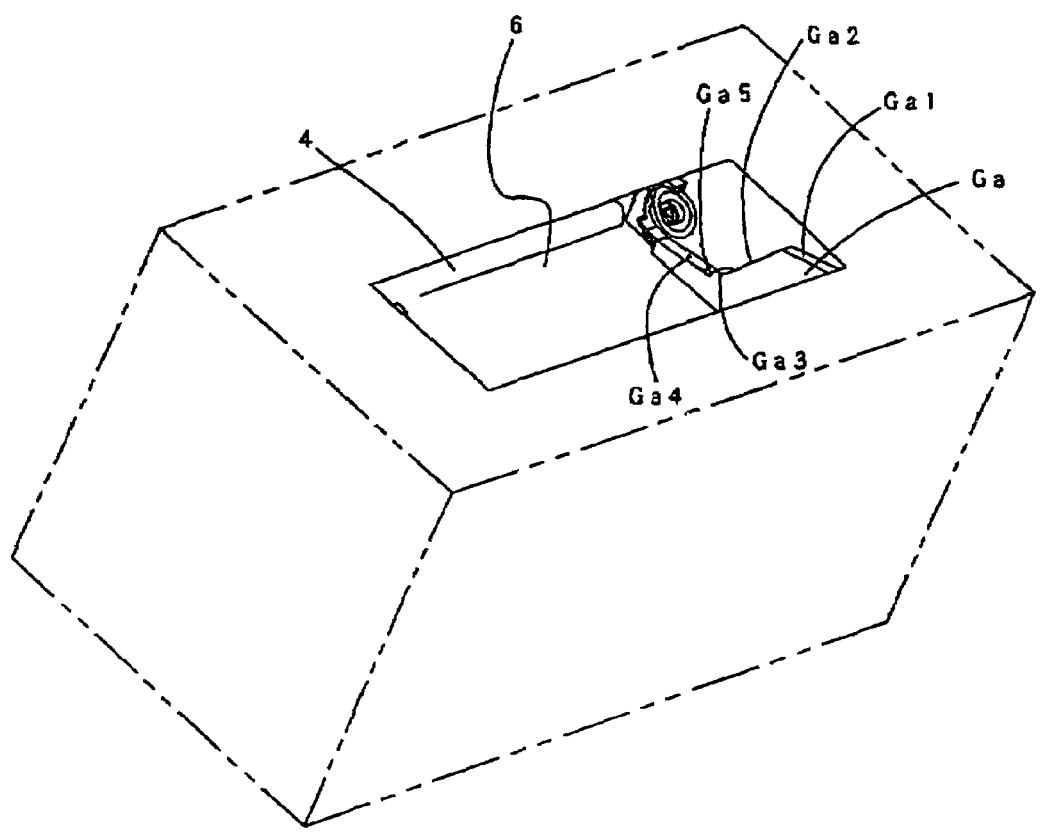
FIG. 11 is a schematic perspective view of a right guide provided on the main body of the image forming apparatus according to the embodiment of the invention.
Figure 12:
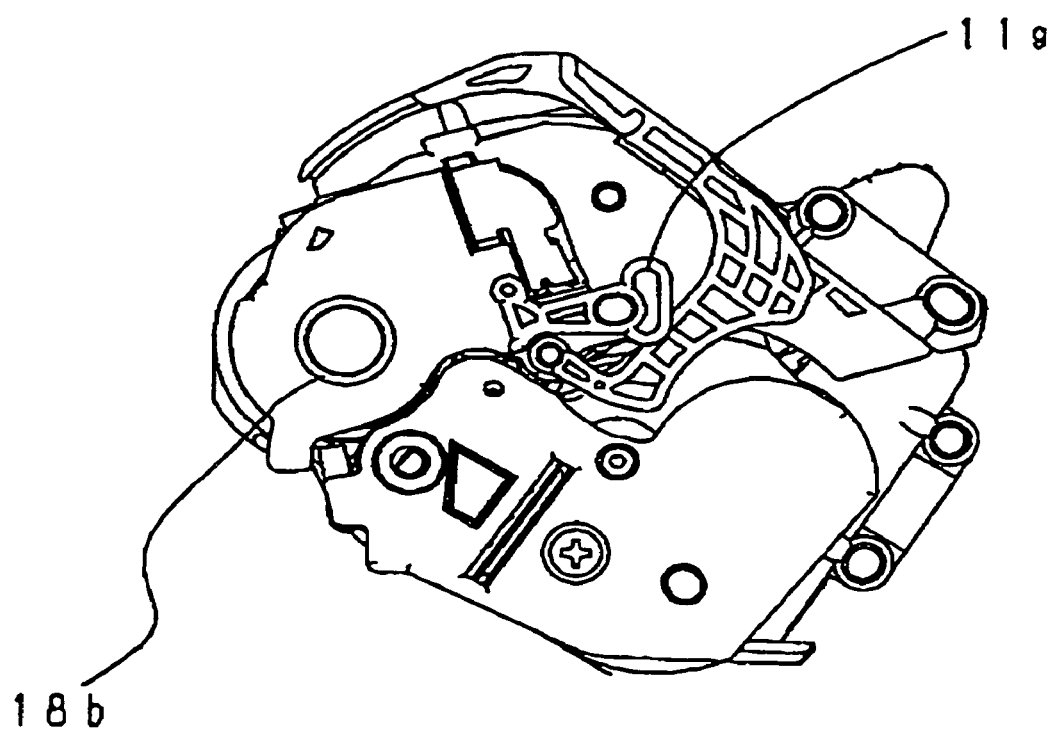
FIG. 12 is a left side view of the process cartridge according to the embodiment of the invention.
Figure 13:
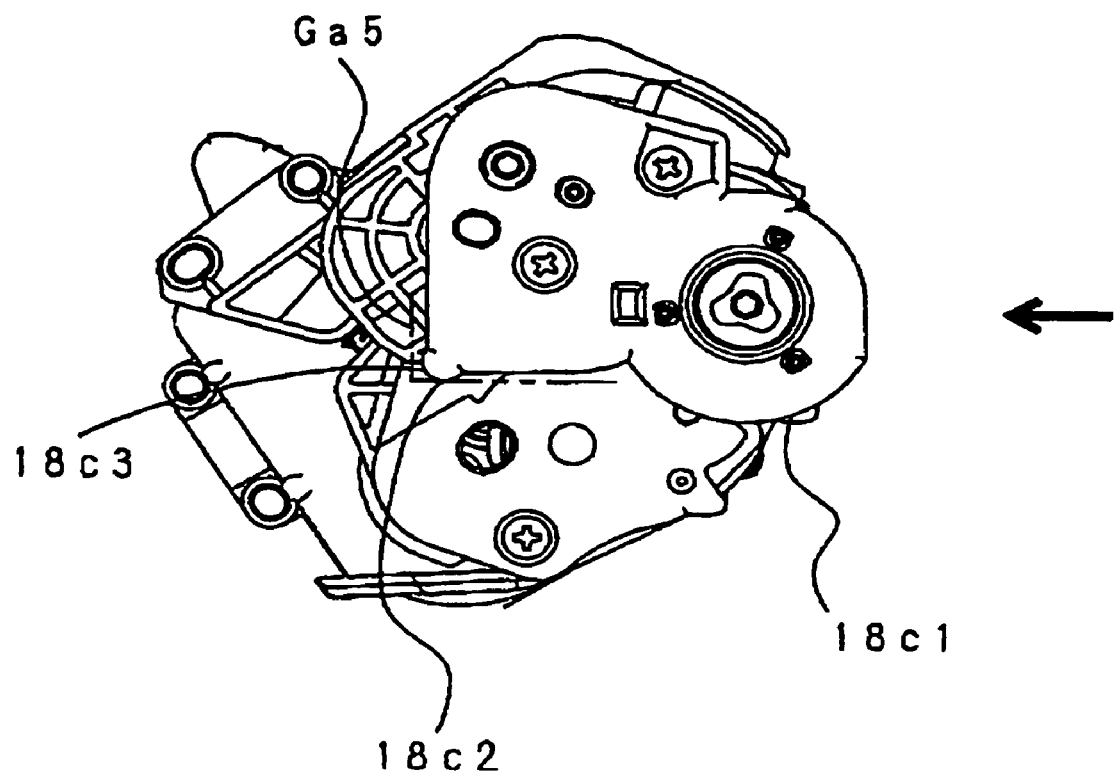
FIG. 13 is a right side view of the process cartridge according to the embodiment of the invention.

The manner of loading the cartridge B assembled in the above-described manner into the main body of the apparatus A will be described below with reference to FIGS. 9 to 13. FIG. 10 is a perspective view of a left guide provided on the main body of the apparatus A, FIG. 11 is a perspective view of a right guide provided on the main body of the apparatus A, FIG. 12 is a left side view of the process cartridge B, and FIG. 13 is a right side view of the process cartridge B.

The bearing member 18c secured to the cleaning frame lid of the cartridge B is provided with a circular-arc portion 18c1 (refer to FIG. 4) which serves as a first abutment portion formed coaxially with the axis of the photosensitive drum 7 and a rotation stopping portion 18c2 (refer to FIG. 4) which serves as a second abutment portion formed in a circular-arc-like shape for controlling the attitude of the cartridge B, the rotation stopping portion 18c2 being positioned in a corner of the bearing member 18c and formed at the bottom of a cartridge frame, as a loaded guide into the main body of the apparatus A.

The circular-arc portion 18c1 is disposed in such a manner as to be positioned at the outside of the developing unit 10 as viewed in the direction of the drum axis of the developing unit 10 and to overlap the developing unit 10 at least in part as viewed in cross section. The rotation stopping portion 18c2 is positioned at the outside of the developing unit 10, and overlaps the developing unit 10 in all the axial directions of the photosensitive drum 7. In addition, the rotation stopping portion 18c2 is disposed at the rear of the circular-arc portion 18c1 as viewed in the inserting direction.

In this embodiment, the triangular coupling 70 which receives driving force from the main body of the apparatus A is disposed on the inside of the bearing member 18c as viewed in the direction of the drum axis.

As shown in FIG. 11, the main body of the apparatus A is provided with a guide member Ga which serves as a first body guide for guiding the cartridge B to an image forming position (or loading position) while sliding the above-described two circular-arc portions 18c1 and rotation stopping portion 18c2.

In addition, the side of the cleaning frame 1d that is opposite to the bearing member 18c of the cartridge B as viewed in the direction of the drum axis is provided with the positioning portion 18b for covering the positioning pin 18d, and a projecting portion 11g for controlling the position of the cartridge B during loading and unloading.

In addition, as shown in FIG. 10, the main body of the apparatus A is provided with a guide member Gb which serves as a second body guide, so that the attitude of the cartridge B that is controlled on the side of the bearing member 18c can be similarly held on the opposite side to prevent the cartridge B from becoming oblique with respect to the direction of the drum axis.

The manner of loading the cartridge B into the main body of the apparatus A will be described below.

At first, an openable lid member (not shown) which constitutes the discharge section 6 of the main body of the apparatus A is opened to expose the guide members Ga and Gb. Then, the circular-arc portion 18c1 and the rotation stopping portion 18c2 of the cartridge B are placed on a first guide surface Ga1 whose front portion is somewhat bent, of this guide member Ga, in such a manner that the circular-arc portion 18c1 of the cartridge B takes a front position, while the rotation stopping portion 18c2 of the cartridge B takes a rear position. Accordingly, the positioning portion 18b and the projecting portion 11g of the cartridge B are brought into abutment with a first guide surface Gb1 of the other guide member Gb.

In this state, the cartridge B is forced inwardly of the main body of the apparatus A.

When the cartridge B is forced inwardly, the circular-arc portion 18c1 and the rotation stopping portion 18c2 of the cartridge B are slidingly guided to a loading position which is defined by a second guide surface Ga2 provided in a direction approximately perpendicular to the first guide surface Ga1, a third guide surface Ga3 provided to extend approximately horizontally from the second guide surface Ga2, and a curved, fourth guide member Ga4 which is provided in a form continuous with the third guide surface Ga3.

In this manner, the circular-arc portion 18c1 of the cartridge B is brought into abutment with the fourth guide surface Ga4 which serves as a first body receiving portion. In addition, the rotation stopping portion 18c2 is placed onto the third guide surface Ga3 with its rear curved surface portion held in abutment with the second guide surface Ga2. In this placed state, the transfer roller 4 and the photosensitive drum 7 are brought into abutment with each other, and a repulsive force is given to the cartridge B in the direction of the arrow shown in FIG. 13. At this time, a third abutment portion 18c3 is brought into abutment with a fifth guide surface Ga5 positioned in the vicinity of the third guide surface Ga3, to prevent the positional deviation of the cartridge B. Incidentally, the third abutment portion 18c3 may be integral with or separate from the rotation stopping portion 18c2 which serves as the second abutment portion.

In the meantime, the positioning portion 18b and the projecting portion 11g of the cartridge B that are disposed on the opposite side are slidingly guided to the loading position which is defined by a plurality of guide surfaces such as a second guide surface Gb2, a third guide surface Gb3 and a fourth guide surface Gb4 all of which are provided continuously with the first guide surface Gb1. The positioning portion 18b is finally guided to a positioning position Gb5.

In the above-described manner, the cartridge B is loaded at the loading position relative to the main body of the apparatus A. Then, when the lid of the main body of the apparatus A is closed, the triangular coupling 70 of the cartridge B meshes with an approximately triangular concave driving transmitting member (not shown) of the main body of the apparatus A. In this manner, rotational driving force is transmitted from the main body of the apparatus A to the cartridge B.

In this manner, the cartridge B rotates about its rotational central axis which is the axis of the photosensitive drum 7. At this time, the third abutment portion 18c3 of the bearing member 18c in abutment with the guide and the fifth guide surface Ga5 are spaced apart from each other, and the rotation stopping portion 18c2 of the bearing member 18c is brought into abutment with the third guide surface Ga3 which is a defining surface of the guide member Ga, thereby effecting positioning relative to the rotating direction.

In the meantime, as the result of the loading of the cartridge B, the positioning portion 18b located on the drum axis of the cleaning frame 11d on the opposite side as viewed in the direction of the drum axis is fitted into a U-shaped groove which is formed by the fourth guide surface Gb4 and serves as a positioning portion. Thus, the positioning portion 18b is positioned by a pressure spring (not shown) for restraining the repulsive force of the transfer roller 4 and the fluctuation of the same during driving. The projecting portion 11g of the cleaning frame 11d is set to a position and a size which can prevent the projecting portion 11g from coming into abutment with the main body of the apparatus A, within the range of the precision of each part and the precision of assembly.

At an intermediate time during the above-described loading operation, the rib 12e of the drum shutter 12 is brought into abutment with a first shutter guide surface Gb7 formed on the guide member Gb. Then, the rotating operation of the drum shutter 12 starts. After that, in accordance with the manner of loading the cartridge B, the rib 12e is brought into abutment with a second shutter guide surface Gb8 and slides over the second shutter guide surface Gb8, and the drum shutter 12 is finally retained in the state shown in FIGS. 1 and 2 on a third guide surface Gb9.

The attitude of the cartridge B for image formation is prepared in the above-described manner, and image formation is started.

When the cartridge B is to be removed from the main body of the apparatus A, the cartridge B is removed from the loading position to the outside of the apparatus along the corresponding guide members Ga and Gb of the main body of the image forming apparatus A in accordance with the reverse operation to the above-described loading operation. At the same time, the drum shutter 12 sequentially rotates and closes to cover the photosensitive drum 7.

Incidentally, while the cartridge B is being unloaded from the loading position, the projecting portion 11g comes into contact with the positioning position Gb5 formed on the upper surface of the guide member Gb, and works to prevent the forward side of the cartridge B as viewed in the unloading direction from trying to rotate upwardly beyond a predetermined amount.

(Bearing Member)

Figure 14A:
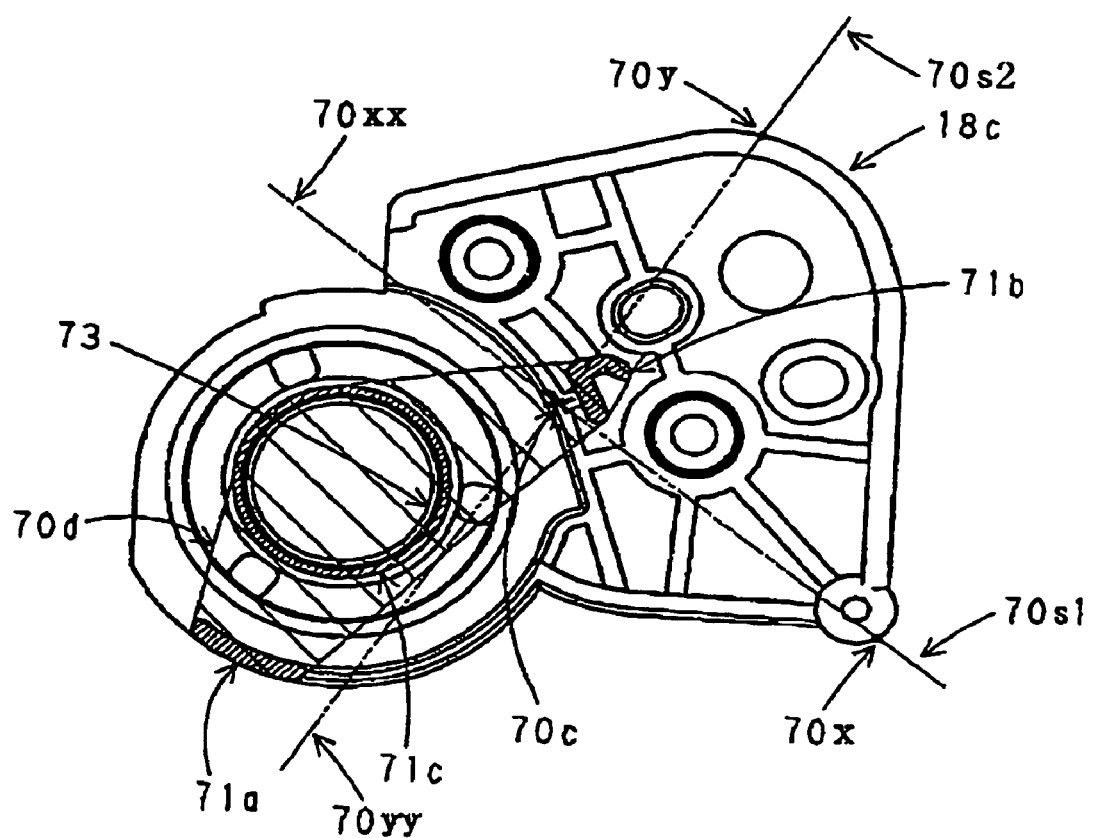
FIGS. 14A and 14B are, respectively, a top plan view and a perspective view of a bearing member according to the embodiment of the invention.
Figure 14B:
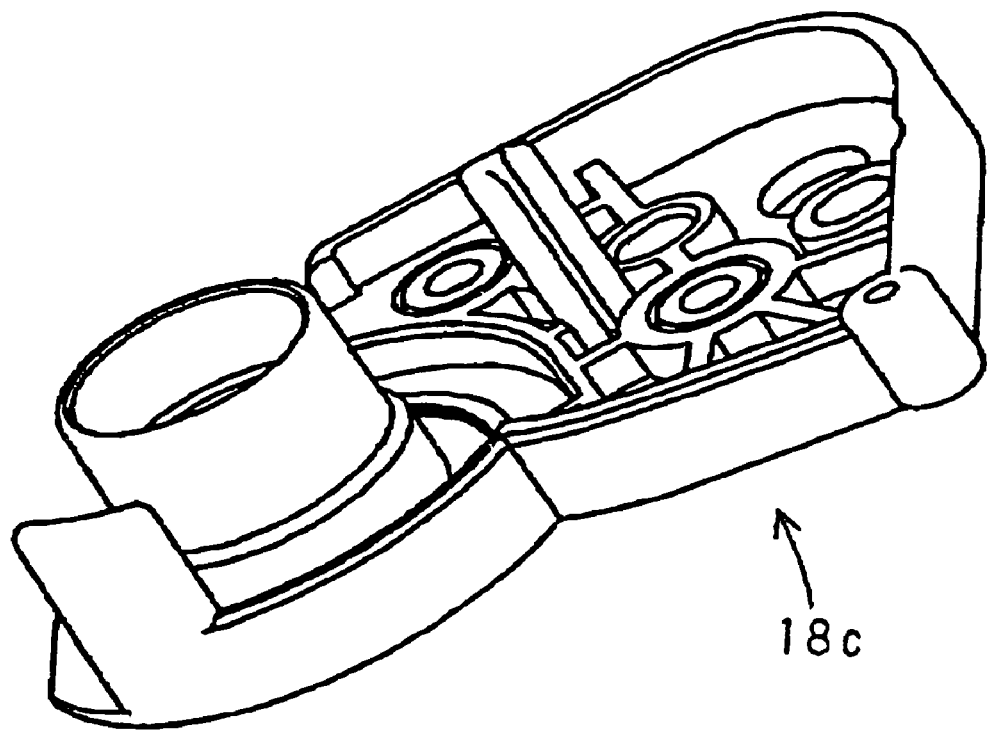
Figure 15A:
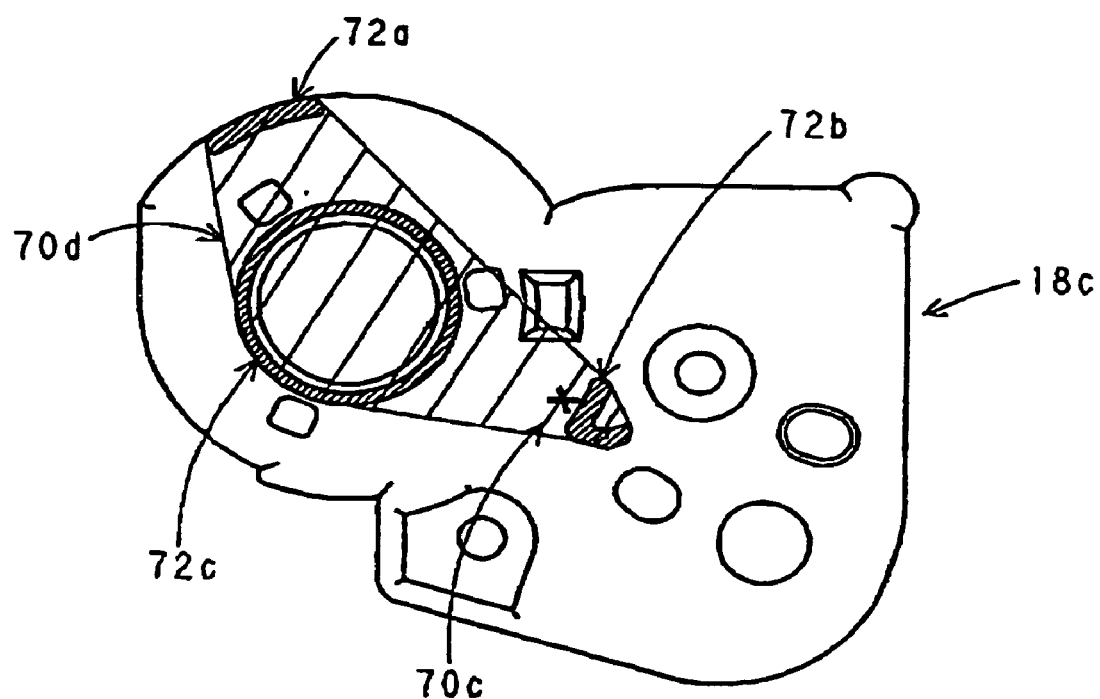
FIGS. 15A and 15B are, respectively, a top plan view and a perspective view showing the bearing member according to the embodiment of the invention, as viewed from the opposite side to the portion shown in FIGS. 14A and 14B.
Figure 15B:
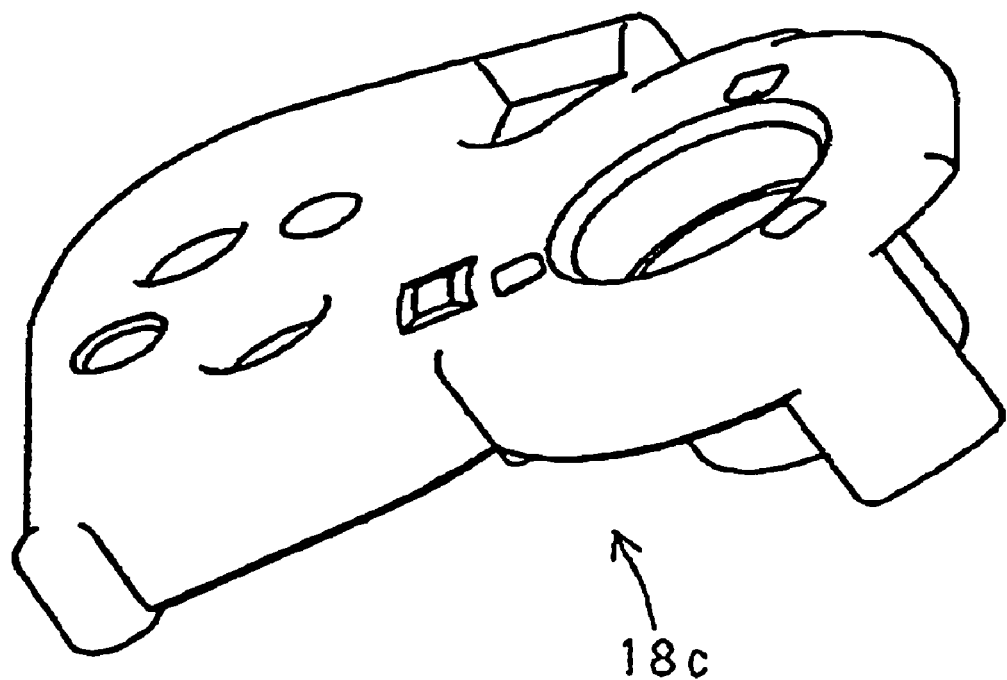
Figure 16:
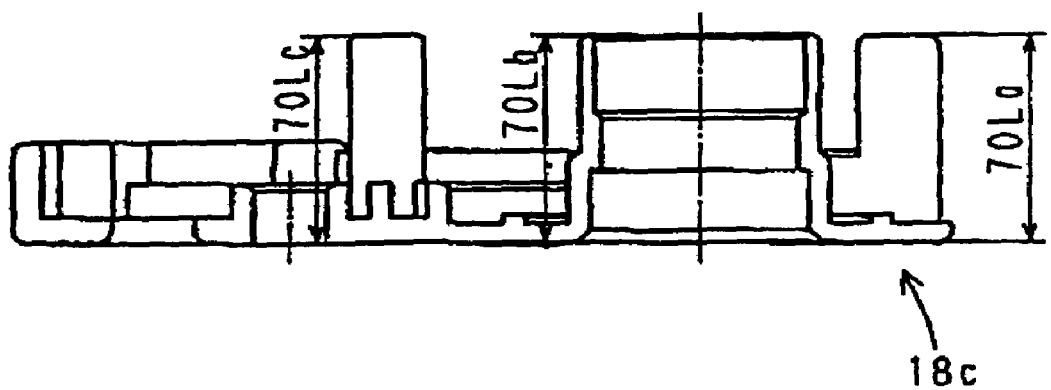
FIG. 16 is a cross-sectional side view of the bearing member according to the embodiment of the invention.
Figure 17:
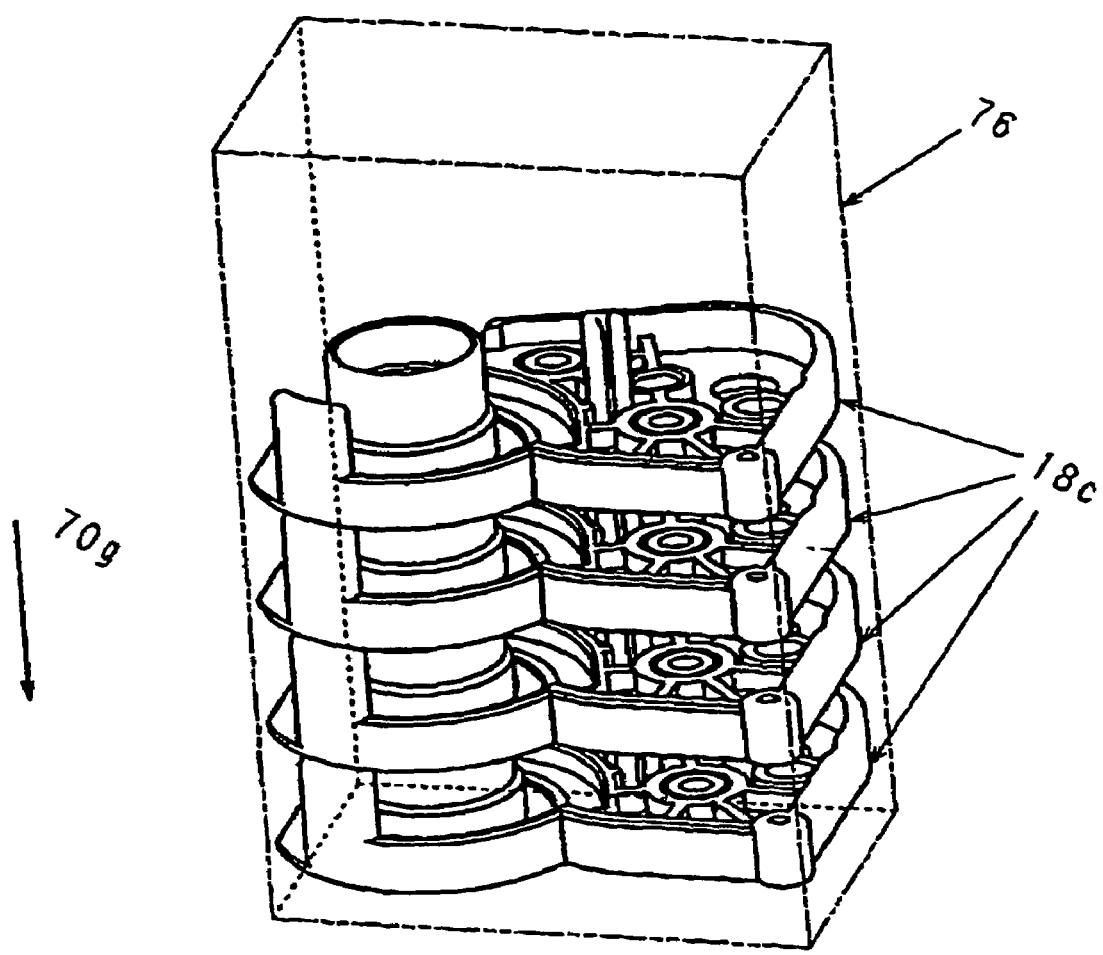
FIG. 17 is a perspective view showing the manner in which the bearing members according to the embodiment of the invention are stacked.

The details of the bearing member 18c which constitutes part of the cleaning unit 11 will be described below with reference to FIGS. 14A through 17. FIGS. 14A and 14B are, respectively, a top plan view and a perspective view of the bearing member 18c according to this embodiment. FIGS. 15A and 15B are, respectively, a top plan view and a perspective view showing the bearing member 18c according to this embodiment, as viewed from the opposite side to the portion shown in FIGS. 14A and 14B. FIG. 16 is a cross-sectional side view of the bearing member 18c according to this embodiment. FIG. 17 is a perspective view showing the manner in which the bearing members 18c according to this embodiment are stacked.

The bearing member 18c is provided with a sliding portion 73. The bearing member 18c rotatably supports the photosensitive drum 7 by means of the sliding portion 73.

The bearing member 18c is also provided with abutment portions 71a, 71b and 71c at three local positions (refer to FIG. 14A). The opposite side of the bearing member 18c is provided with receiving portions 72a, 72b and 72c which correspond to the respective abutment portions 71a, 71b and 71c (refer to FIG. 15A). Distances 70La, 70Lb and 70Lc (refer to FIG. 16) between the abutment locations of the respective abutment portions 71a, 71b and 71c and the receiving locations of the corresponding portions 72a, 72b and 72c are all equal (70La=70Lb=70Lc). The bearing member 18c is constructed so that a center of gravity 70c of the bearing member 18c lies in a region which has the largest area among the regions surrounded by the respective abutment portions 71a, 71b and 71c. Accordingly, when a plurality of bearing members 18c are stacked in a gravitational direction 70g, the bearing members 18c are arranged in a column without being inclined (refer to FIG. 17).

As shown in FIG. 14, the center of gravity 70c is defined as a point of intersection of a line 70xx and a line 70yy. The line 70xx is a prolonged line of a string 70s1 by which the bearing member 18c is suspended when the string 70s1 is secured to an arbitrary point 70x of the bearing member 18c. The line 70yy is a prolonged line of a string 70s2 by which the bearing member 18c is suspended when the string 70s2 is secured to an arbitrary point 70y different from the point 70x.

The abutment portions 71a, 71b and 71c and the receiving portions 72a, 72b and 72c are disposed at positions different from the sliding portion 73 for sliding contact with the photosensitive drum 7.

Accordingly, when a plurality of bearing members 18c are stacked in the same attitude, the bearing members 18c are arranged in a column in the same attitude. In addition, the sliding portions 73 of the bearing members 18c do not contact with any portions (refer to FIG. 17).

(Conveyance of Bearing Member)

The conveyance of the bearing member 18c will be described below. As shown in FIG. 17, the bearing members 18c molded by injection molding in a production factory are packed in a box in an orderly arranged state, or are put into a case 76 which has a guide in its inside and has the shape of an approximately rectangular prism. Then, the bearing members 18c are conveyed to the cartridge assembly line.

The case 76 has a cross-sectional shape which has a predetermined amount of looseness with respect to the external shape of the bearing member 18c, and the cross-sectional shape serves the role of the guide for arranging the bearing members 18c in a column. The cross-sectional shape is not limited to such an approximately rectangle. It is also preferable that beam-shaped convex portions corresponding to the shapes of parts be provided on the inside of the case 76 so that parts are prevented from turning while they are being put into the case 76.

In the description of this embodiment, reference is been made to an example using the case 76. However, in the case where an injection molding machine and an assembly process line are disposed near each other, the bearing members 18c need not be packed in the case 76, and the parts may also be supplied in such a way as to be directly put into a tubular guide from above and taken out of it from below.

The above-described bearing member 18c which is designed so that a plurality of members 18c can be arranged in the same attitude is supplied by a supplying method which will be described below. First of all, the bearing member 18c is inserted into the case 76 or the guide which extends in the gravitational direction (or perpendicular direction) with a predetermined range of inclination (for example, 30° or less) with respect to its orderly arranged state from above the case 76 or the guide (part inserting step S1). The inserted bearing member 18c comes into abutment with any abutment portion (for example, 71a) of the three abutment portions 71a, 71b and 71c of a bearing member 18c which has previously been inserted and placed in the orderly arranged state, whereby the inserted bearing member 18c is positioned within the guide in the gravitational direction (gravitational-direction positioning step S2). Then, the portion of the bearing member 18c that is closer to the center of gravity 70c continues to fall while moving downward about the abutment portion (for example, 71a), whereby the bearing member 18c comes into abutment with the other abutment portions (for example, 71b and 71c). In this manner, the part is corrected for inclination and arranged in a column (inclination correcting step S3). The parts thus arranged in a column are supplied from the bottom of the guide to the assembly process in the same attitude (arranged-parts supplying step S4).

According to this method, the sliding portions 73 of adjacent ones of the bearing members 18c do not come into contact with each other. Accordingly, it is possible to eliminate the risk that the sliding portions 73 may be damaged by vibration or impact during conveyance. The above-described method can also be applied to other constituent parts which will be described later.

(Supply of Bearing Member in Process Cartridge Assembly Line)

The supply of the bearing member 18c in the cartridge assembly line will be described below.

The bearing members 18c conveyed to the cartridge assembly line are packed in a box or placed in the case 76 in the orderly arranged state. Accordingly, an assembly worker can easily take out the bearing members 18c from the case 76 one by one.

In addition, if the bearing members 18c are to be directly supplied from the case 76 to an automatic cartridge assembly machine, it is not necessary to use a device called a parts feeder for making the direction of arrangement of cartridge parts uniform or making the positional relationship between the obverse and reverse sides of each of the cartridge parts uniform. Since the bearing members 18c placed in the case 76 are arranged in a column, the bearing members 18c can be easily supplied one by one to the automatic cartridge assembly machine.

(End Member)

Figure 18B:
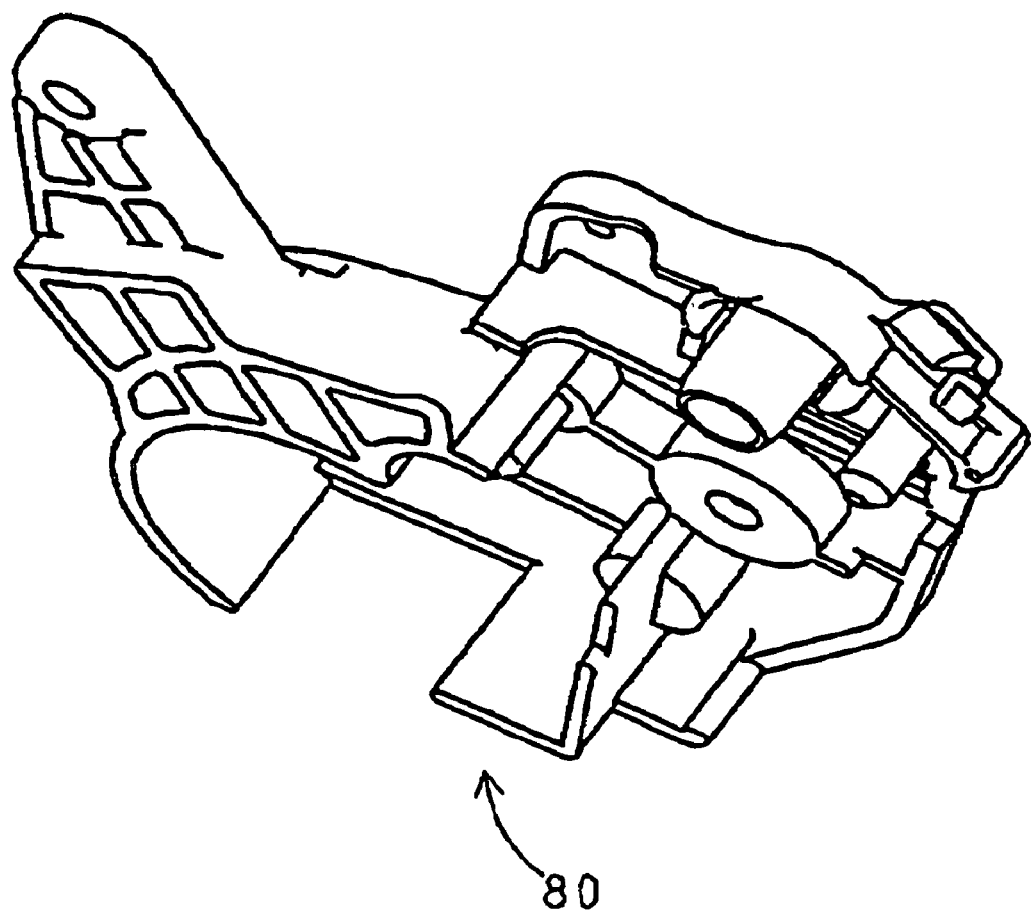
Figure 19A:
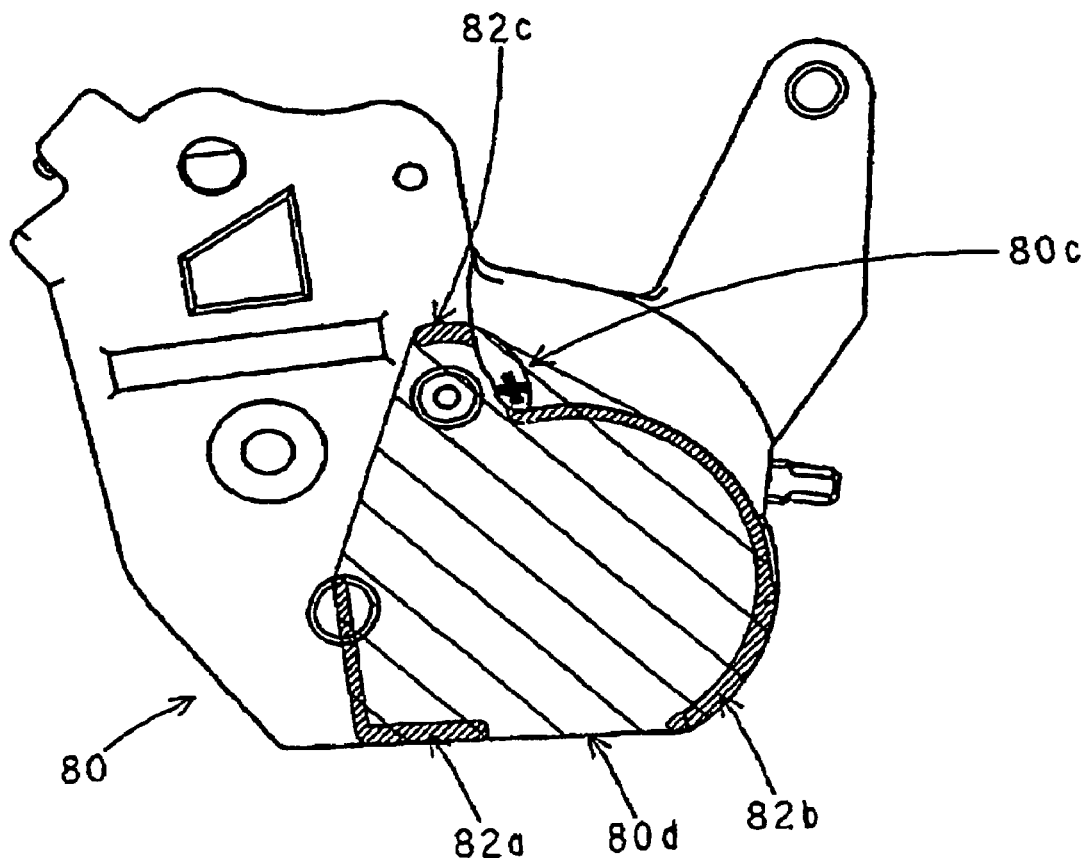
FIGS. 19A and 19B are, respectively, a top plan view and a perspective view showing the end member according to the embodiment of the invention, as viewed from the opposite side to the portion shown in FIGS. 18A and 18B.
Figure 19B:
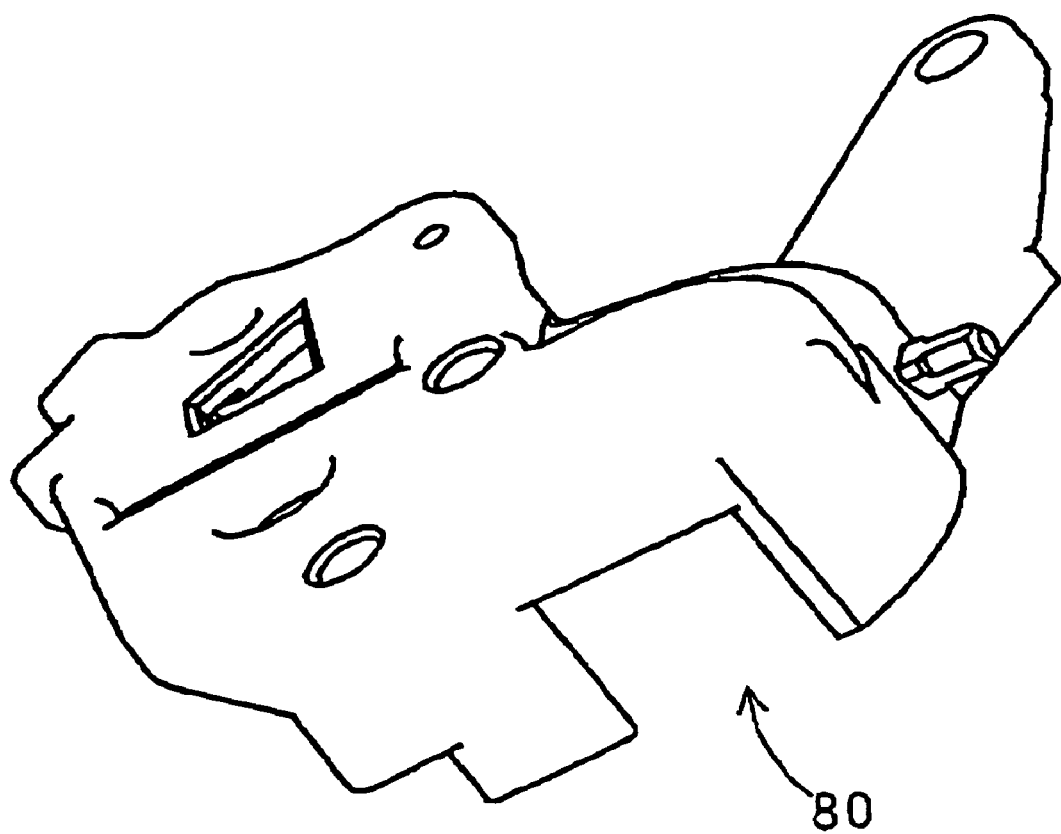
Figure 20:
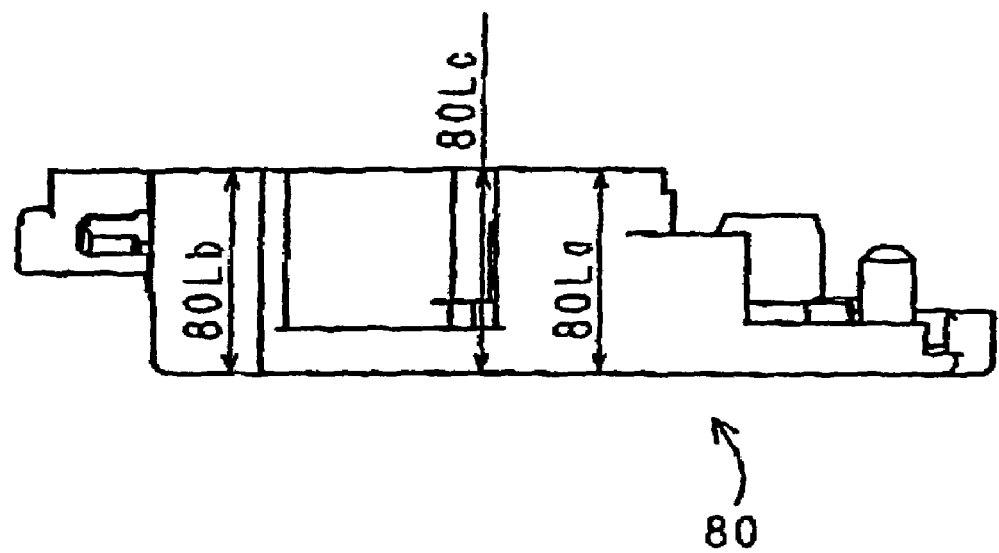
FIG. 20 is a cross-sectional side view of the end member according to the embodiment of the invention.
Figure 21:
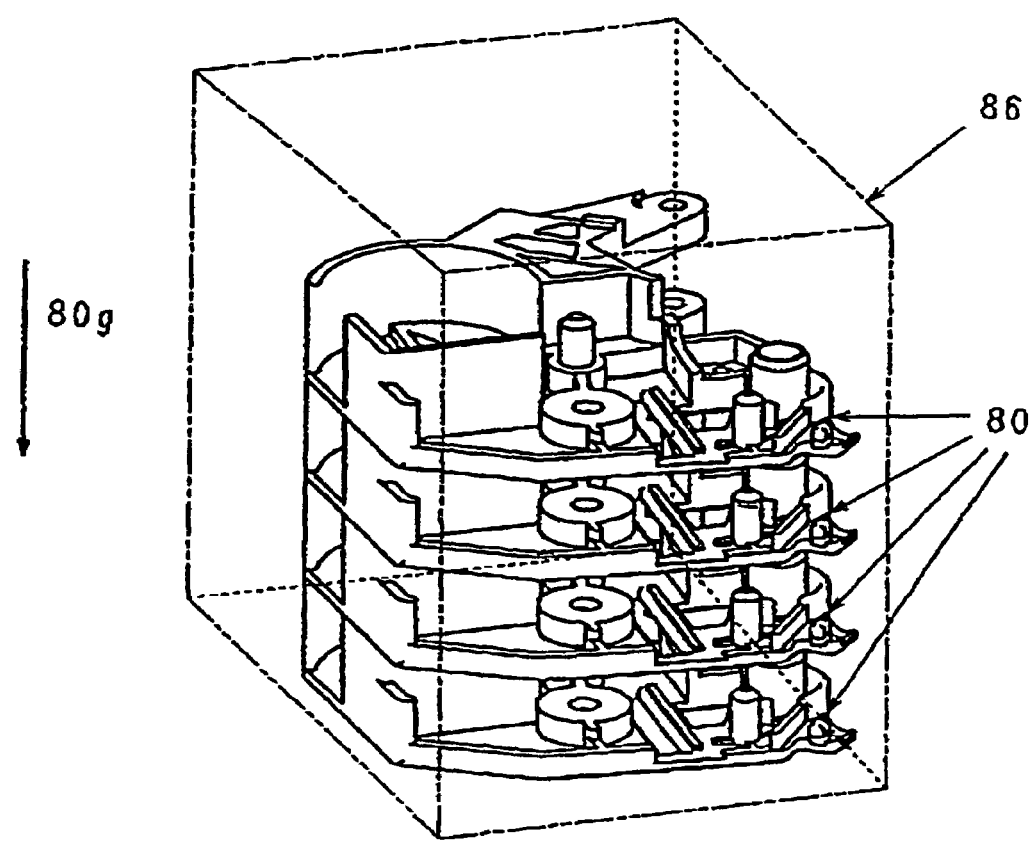
FIG. 21 is a perspective view showing the manner in which the end members according to the embodiment of the invention are stacked.

The details of an end member 80 which constitutes part of the developing unit 10 will be described below with reference to FIGS. 18A to 21. FIGS. 18A and 18B are, respectively, a top plan view and a perspective view of the end member 80 according to this embodiment. FIGS. 19A and 19B are, respectively, a top plan view and a perspective view showing the end member 80 according to this embodiment, as viewed from the opposite side to the portion shown in FIGS. 18A and 18B. FIG. 20 is a cross-sectional side view of the end member 80 according to this embodiment. FIG. 21 is a perspective view showing the manner in which the end members 80 according to this embodiment are stacked.

The end member 80 is provided with a sliding portion 83. The end member 80 rotatably supports the developing roller 10d by means of the sliding portion 83.

The end member 80 is also provided with abutment portions 81a, 81b and 81c at three local positions (refer to FIG. 18A). The opposite side of the end member 80 is provided with receiving portions 82a, 82b and 82c which correspond to the respective abutment portions 81a, 81b and 81c (refer to FIG. 19A). Distances 80La, 80Lb and 80Lc (refer to FIG. 20) between the abutment locations of the respective abutment portions 81a, 81b and 81c and the receiving locations of the corresponding portions 82a, 82b and 82c are all equal (80La=80Lb=80Lc). The end member 80 is constructed so that a center of gravity 80c of the end member 80 lies in a region which has the largest area among the regions surrounded by the respective abutment portions 81a, 81b and 81c. Accordingly, when a plurality of end members 80 are stacked in a gravitational direction 80g, the end members 80 are arranged in a column without being inclined (refer to FIG. 21).

The abutment portions 81a, 81b and 81c and the receiving portions 82a, 82b and 82c are disposed at positions different from the sliding portion 83 for sliding contact with the developing roller 10d.

Accordingly, when a plurality of end members 80 are stacked in the same attitude, the end members 80 are arranged in a column in the same attitude. In addition, the sliding portions 83 of the end members 80 do not come into contact with any portions (refer to FIG. 21).

Figure 22A:
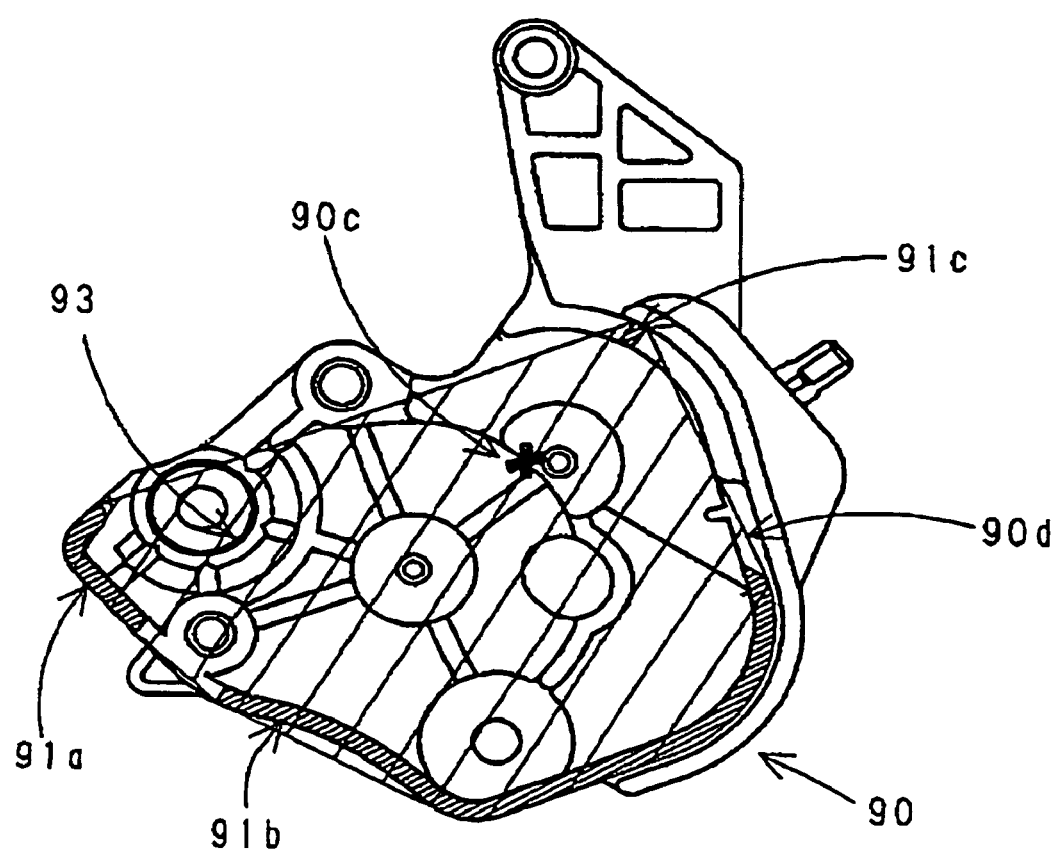
FIGS. 22A and 22B are, respectively, a top plan view and a perspective view of another end member according to the embodiment of the invention.
Figure 22B:
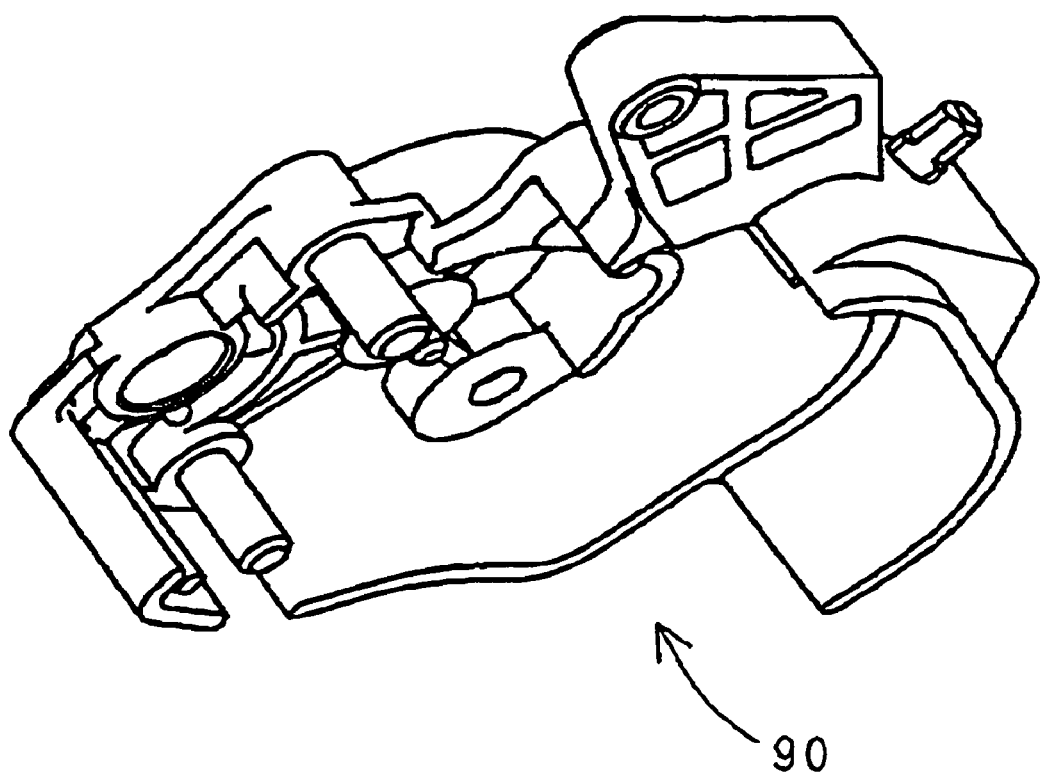
Figure 23A:
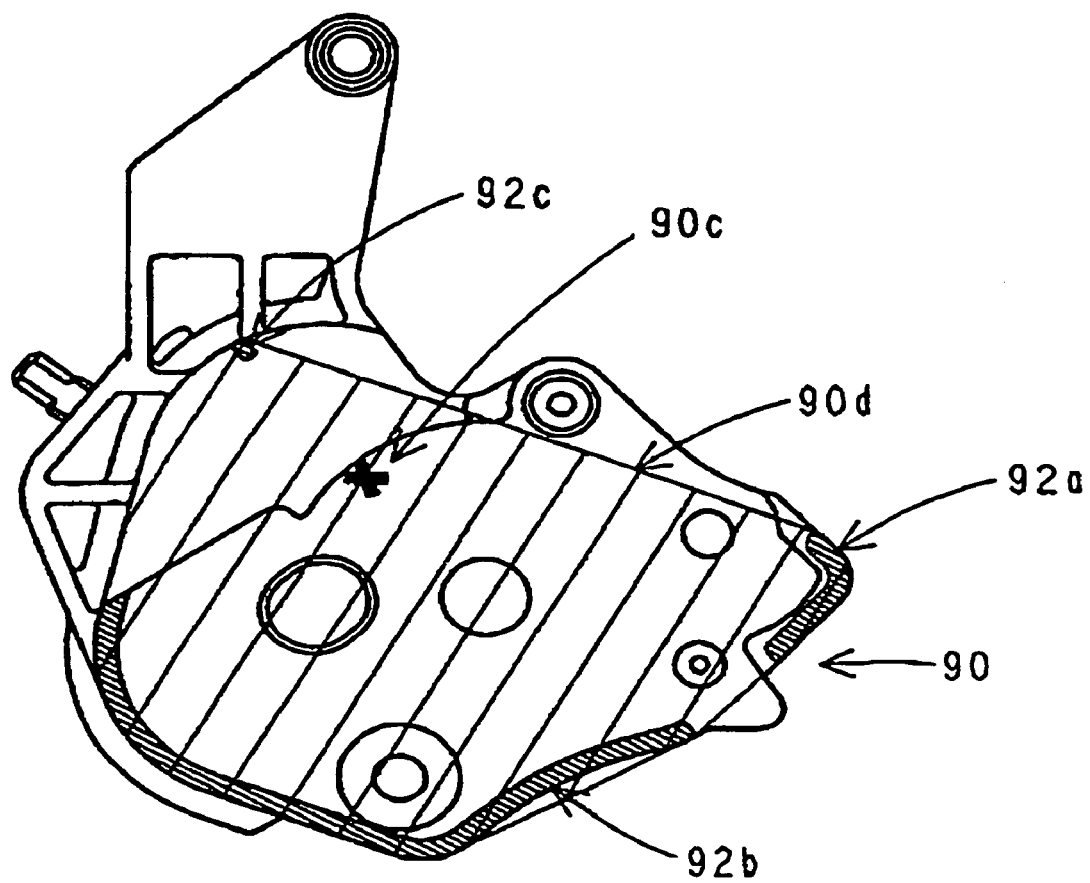
FIGS. 23A and 23B are, respectively, a top plan view and a perspective view showing the another end member according to according to the embodiment of the invention, as viewed from the opposite side to the portion shown in FIGS. 22A and 22B.
Figure 23B:
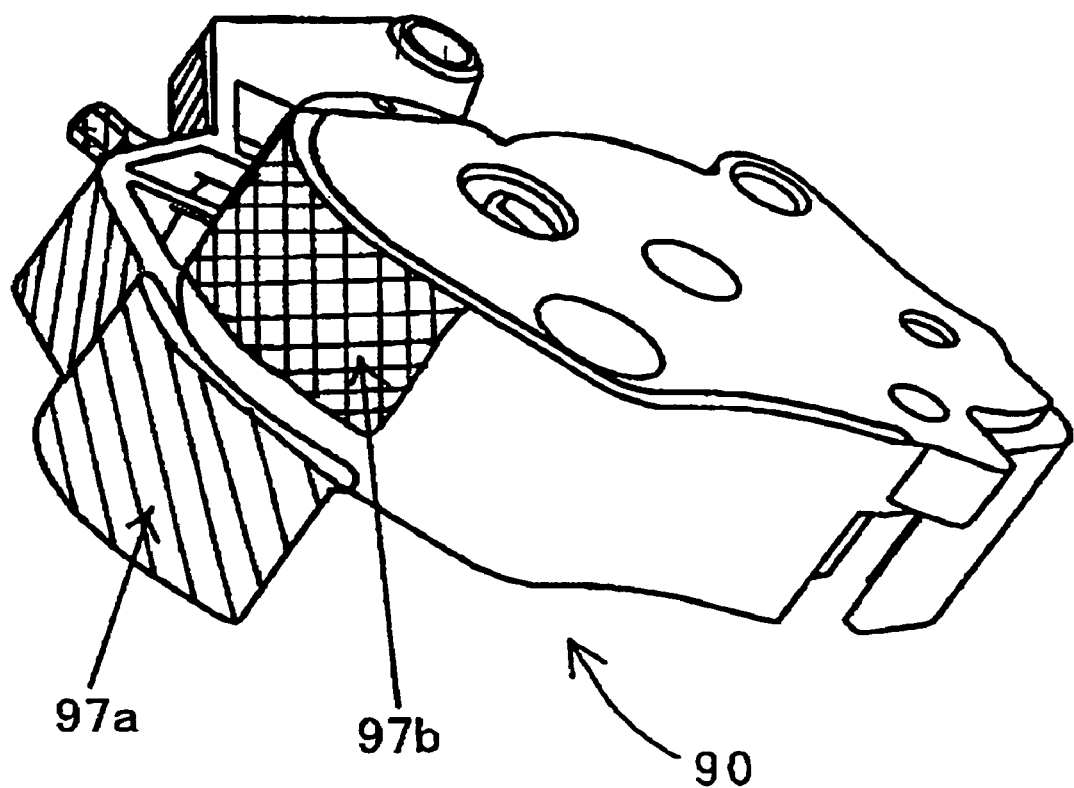
Figure 24:
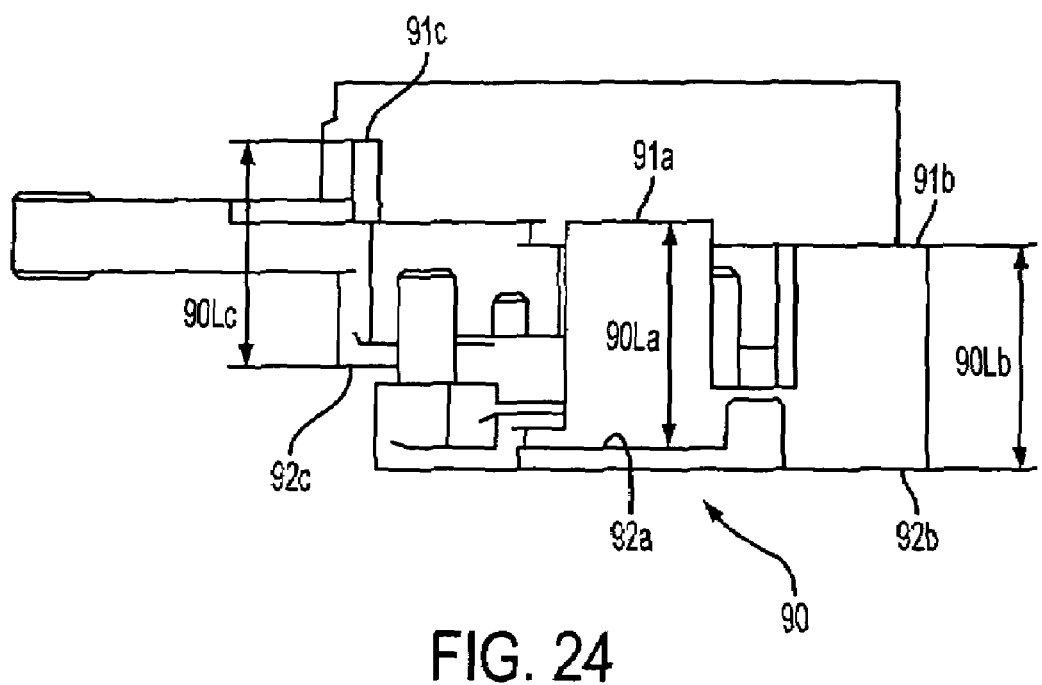
FIG. 24 is a cross-sectional side view of the another end member according to the embodiment of the invention.
Figure 25:
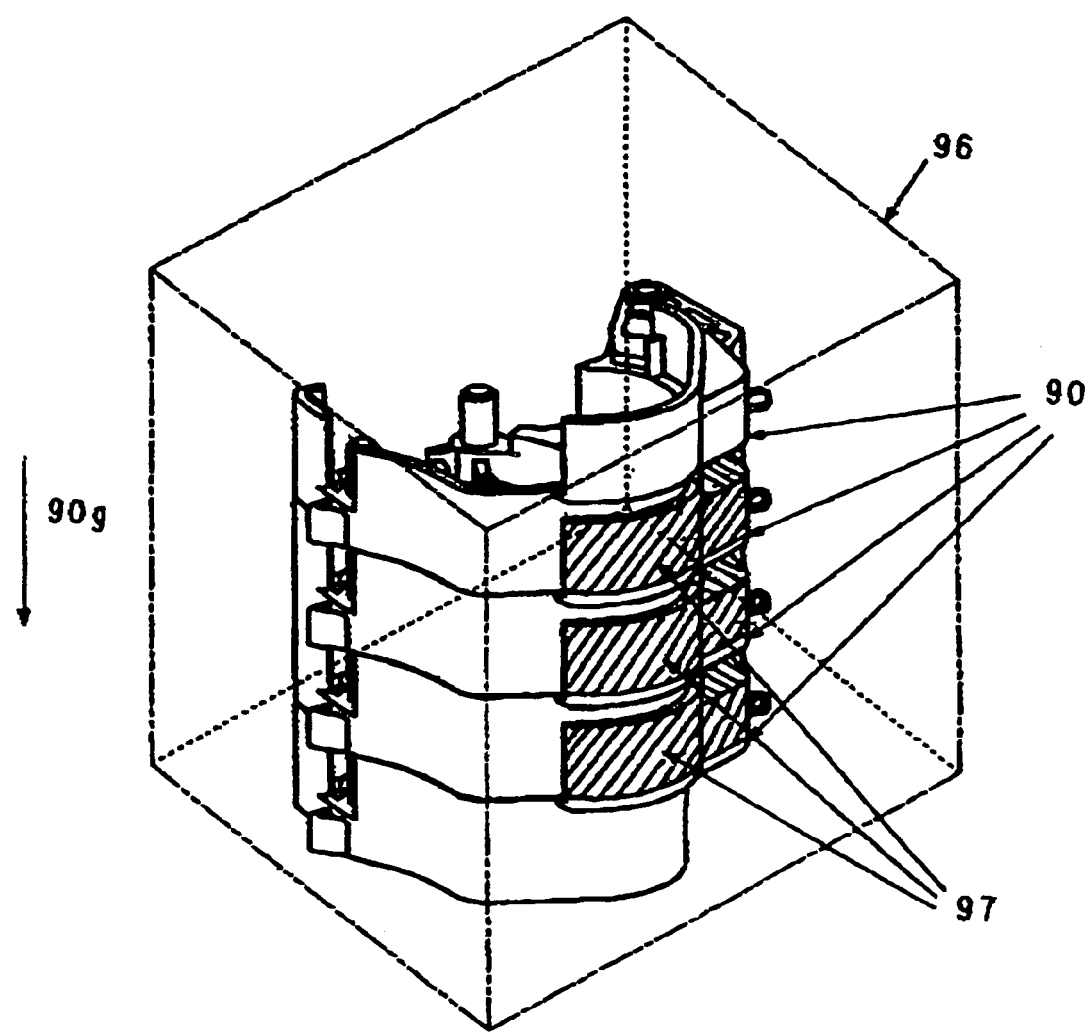
FIG. 25 is a perspective view showing the manner in which the another end members according to the embodiment of the invention are stacked.

The details of an end member 90 which constitutes part of the developing unit 10 will be described below with reference to FIGS. 22A to 25. FIGS. 22A and 22B are, respectively, a top plan view and a perspective view of the end member 90 according to this embodiment. FIGS. 23A and 23B are, respectively, a top plan view and a perspective view showing the end member 90 according to this embodiment, as viewed from the opposite side to the portion shown in FIGS. 22A and 22B. FIG. 24 is a cross-sectional side view of the end member 90 according to this embodiment. FIG. 25 is a perspective view showing the manner in which the end members 90 according to this embodiment are stacked.

The end member 90 is provided with a sliding portion 93. The end member 90 rotatably supports the developing roller 10d by means of the sliding portion 93.

The end member 90 is also provided with abutment portions 91a, 91b and 91c at three local positions (refer to FIG. 22A). The opposite side of the end member 90 is provided with receiving portions 92a, 92b and 92c which correspond to the respective abutment portions 91a, 91b and 91c (refer to FIG. 23A). Distances 90La, 90Lb and 90Lc (refer to FIG. 24) between the abutment locations of the respective abutment portions 91a, 91b and 91c and the receiving locations of the corresponding portions 92a, 92b and 92c are all equal (90La=90Lb=90Lc). The end member 90 is constructed so that a center of gravity 90c of the end member 90 lies in a region which has the largest area among the regions surrounded by the respective abutment portions 91a, 91b and 91c. Accordingly, when a plurality of end members 90 are stacked in a gravitational direction 90g, the end members 90 are arranged in a column without being inclined (refer to FIG. 25).

The abutment portions 91a, 91b and 91c and the receiving portions 92a, 92b and 92c are disposed at positions different from the sliding portion 93 for sliding contact with the developing roller 10d.

Accordingly, when a plurality of end members 90 are stacked in the same attitude, the end members 90 are arranged in a column in the same attitude. In addition, the sliding portions 93 of the end members 90 do not come into contact with any portions (refer to FIG. 25).

(Conveyance of End Member)

The conveyance of the end member 80 will be described below. As shown in FIG. 21, the end members 80 molded by injection molding in a production factory are packed in a box in an orderly arranged state, or are put into a case 86 which has a guide in its inside and has the shape of an approximately rectangular prism. Then, the end members 80 are conveyed to the cartridge assembly line.

During this time, the sliding portions 83 of adjacent ones of the end members 80 do not come into contact with each other. Accordingly, it is possible to eliminate the risk that the sliding portions 83 may be damaged by vibration or impact during conveyance.

The conveyance of the end member 90 will be described below. As shown in FIG. 25, the end members 90 molded by injection molding in a production factory are packed in a box in an orderly arranged state, or are put into a case 96 which has a guide in its inside and has the shape of an approximately rectangular prism. Then, the end members 90 are conveyed to the cartridge assembly line.

During this time, the sliding portions 93 of adjacent ones of the end members 90 do not come into contact with each other. Accordingly, it is possible to eliminate the risk that the sliding portions 93 may be damaged by vibration or impact during conveyance.

When a plurality of end members 90 are stacked in the gravitational direction 90g, an overlap portion 97b of the upper-side one of the end members 90 and an overlap portion 97a of the lower-side one of the end members 90 overlap each other, so that mutually adjacent parts are accommodated in a joined state. Owing to this overlap portion 97, it is possible to reduce the spatial proportion occupied by the parts when a plurality of end members 90 are arranged in a column. Accordingly, it is possible to arrange far more parts in a column in a space-saving manner.

(Supply of End Member in Process Cartridge Assembly Line)

The supply of the end member 80 in the cartridge assembly line will be described below.

The end members 80 conveyed to the cartridge assembly line are packed in a box or placed in the case 86 in the orderly arranged state. Accordingly, an assembly worker can easily take out the end members 80 from the case 86 one by one.

In addition, if the end members 80 are to be directly supplied from the case 86 to an automatic cartridge assembly machine, it is not necessary to use a device called a parts feeder for uniformizing the direction of arrangement of cartridge parts or the positional relationship between the obverse and reverse sides of each of the cartridge parts. Since the end members 80 placed in the case 86 are arranged in a column, the end members 80 can be easily supplied one by one to the automatic cartridge assembly machine.

The supply of the end member 90 in the cartridge assembly line will be described below.

The end members 90 conveyed to the cartridge assembly line are packed in a box or placed in the case 96 in the orderly arranged state. Accordingly, an assembly worker can easily take out the end members 90 from the case 96 one by one.

In addition, if the end members 90 are to be directly supplied from the case 96 to an automatic cartridge assembly machine, it is not necessary to use a device called a parts feeder for uniformizing the direction of arrangement of cartridge parts or the positional relationship between the obverse and reverse sides of each of the cartridge parts. Since the end members 90 placed in the case 96 are arranged in a column, the end members 90 can be easily supplied one by one to the automatic cartridge assembly machine.

According to the above-described construction, it is possible to prevent the sliding portions of the cartridge parts from being damaged by vibration or impact during the conveyance of the cartridge parts from a production factory to an assembly line. Accordingly, it is possible to provide good-quality images.

In addition, it is possible to easily supply the above-described cartridge parts one by one to a cartridge assembly worker, and it is also possible to supply the above-described cartridge parts to an automatic cartridge assembly machine without using the above-described parts feeder. Accordingly, it is possible to improve the efficiency of assembly of the cartridges.

Accordingly, according to this embodiment, it is possible to provide a cartridge capable of providing a good-quality image by means of a simple construction. In addition, it is possible to improve the efficiency of assembling work for cartridges.

In the above description of the embodiment, reference has been made to bearing members and end members each of which has a sliding portion for sliding contact with another part. However, the range of application of the invention is not limited to these examples, and the invention can also be applied to other types of cartridge parts.

Figure 26:
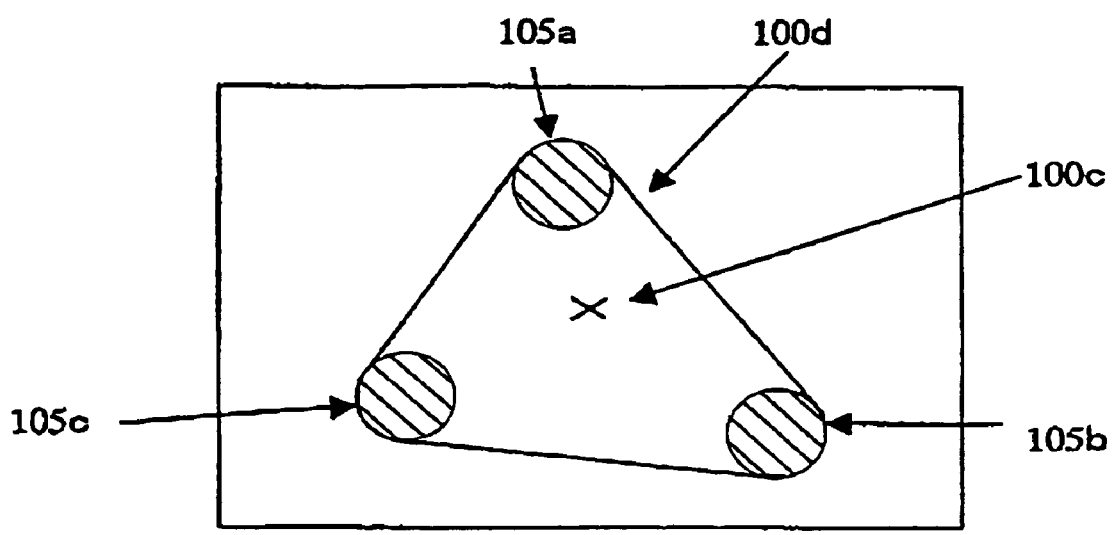
FIG. 26 is a schematic cross-sectional view of a process cartridge part according to another embodiment of the invention.

For example, the invention may be applied to a cartridge part of the type which is provided with abutment portions 105a, 105b and 105c in such a manner that a center of gravity 100c of the cartridge part lies in a region 100d which has the largest area in a region defined by abutment portions 105a, 105b and 105c, as shown in FIG. 26.

Figure 27:
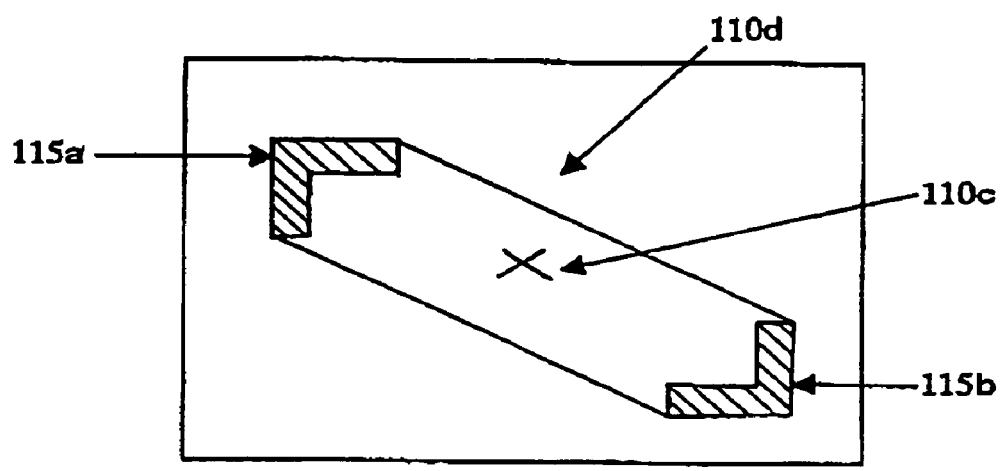
FIG. 27 is a schematic cross-sectional view of a process cartridge part according to another embodiment of the invention.

For example, the invention may be applied to a cartridge part of the type which is provided with abutment portions 115a and 115b in such a manner that a center of gravity 110c of the cartridge part lies in a region 110d which has the largest area in a region defined by abutment portions 115a and 115b, as shown in FIG. 27.

Figure 28:
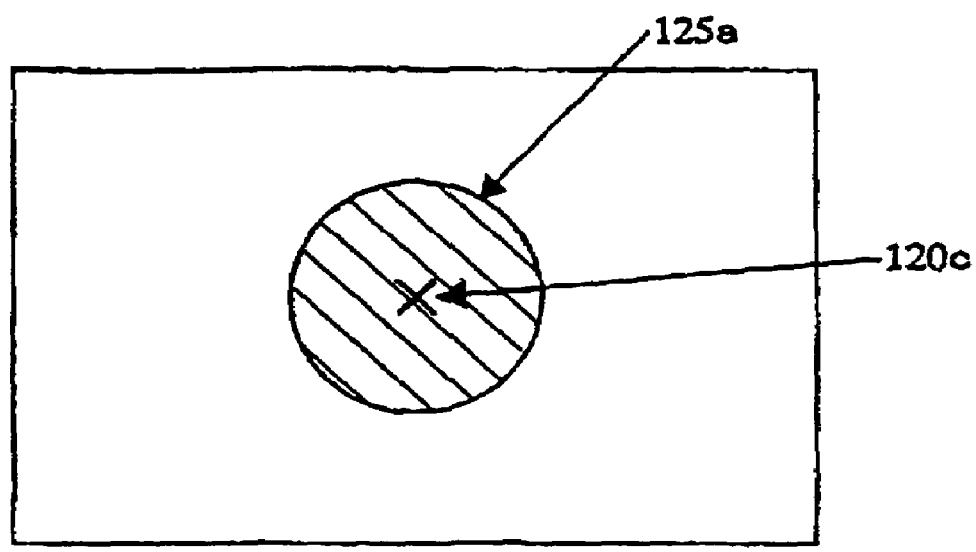
FIG. 28 is a schematic cross-sectional view of a process cartridge part according to yet another embodiment of the invention.

The invention may also be applied to a cartridge part of the type which is provided with an abutment portion 125a in such a manner that a center of gravity 120c of the cartridge part lies in an abutment portion 125a, as shown in FIG. 28.

In addition, although the cartridge used in the above-described embodiment is of the type which forms monochromatic images, the invention can also be suitably applied to a cartridge of the type which is provided with a plurality of developing means and forms images in a plurality of colors (for example, a two-color image, a three-color image or a full-color image).

The kind of electrophotographic photosensitive member is not limited to the above-described photosensitive drum, and includes the following examples. A photoconductor is used as the photosensitive member, and the photoconductor includes, for example, amorphous silicon, amorphous selenium, zinc oxide, titanium oxide and organic photoconductors (OPC).

The shape in which the photosensitive member is to be incorporated is, for example, a drum- or belt-like shape. For example, a drum type of photosensitive member is formed by covering a cylinder of aluminum alloy or the like with a photoconductor by evaporation or coating.

As a developing method, it is possible to use various known developing methods such as a two-component magnetic brush developing method, a cascade developing method, a touch-down developing method and a cloud developing method.

In the above-described embodiment, a so-called contact charging method is used as the construction of the charging means, but as a matter of course, it is possible to use another construction in which tungsten wire which has heretofore been used is surrounded by metal shields such as aluminum on three sides so that positive or negative ions generated by applying a high voltage to the tungsten wire are made to move to the surface of the photosensitive drum to uniformly charge the surface of the same.

The charging means is not limited to the above-described roller type, and may also be of another type such as a blade (charging blade) type, a pad type, a block type, a rod type or a wire type.

As a method of cleaning toner remaining on the photosensitive drum, a blade, a fur brush, a magnetic brush or the like may be used to constitute cleaning means.

The above-described process cartridge is provided with, for example, an electrophotographic photosensitive member and at least one process means. Accordingly, the form of the process cartridge is not limited to the above-described one, and it is also possible to use other forms such as a form in which an electrophotographic photosensitive member and developing means which serves as process means are integrated into a cartridge to be removably fitted into a main body of an apparatus, and a form in which an electrophotographic photosensitive member, developing means which serves as process means, and either of charging means and cleaning means are combined and integrated into a cartridge to be removably fitted into a main body of an apparatus.

Namely, the above-described process cartridge is of the type in which at least developing means and an electrophotographic photosensitive member are integrated into a cartridge to be removably fitted into the main body of the image forming apparatus. This process cartridge can be removably fitted into the main body of the apparatus by a user himself/herself. Accordingly, the user can perform maintenance of the main body of the apparatus for himself/herself.

In the above description of the embodiment, the laser beam printer has been referred to as the electrophotographic image forming apparatus by way of example, but the invention need not be limited to the laser beam printer. As a matter of course, the invention can be applied to an electrophotographic image forming apparatus such as an electrophotographic copying machine, an electrophotographic printer such as an LED printer, a facsimile machine, a word processor, or a multifunction machine (such as a multifunction printer).

The above-described embodiment is as follows.

A part capable of being retained in a guide (for example, the case 76) for retaining a plurality of parts (for example, the bearing members 18c) in such a manner as to stack the parts in a gravitational direction and supplying the parts to a predetermined position, includes:

a plurality of abutment portions (for example, the abutment portions 71a, 71b and 71c) which come into abutment with an upper-side part in the guide and support the upper-side part; and a plurality of receiving portions (for example, the receiving portions 72a, 72b and 72c) with which a plurality of abutment portions provided on a lower-side part in the guide are brought into abutment, the abutment portions and the corresponding receiving portions being disposed on straight lines parallel with a part arranging direction, a center of gravity of the part (for example, the center of gravity 70c) being disposed inside a region surrounded by the plurality of abutment portions, lengths (for example, the distances 70La, 70Lb and 70Lc) between abutment locations at which the respective abutment portions come into abutment with an upper-side part and receiving locations at which the receiving portions corresponding to the respective abutment portions come into abutment with a lower-side part being substantially the same for any of the abutment portions.

A part capable of being retained in a guide (for example, the case 76) for retaining a plurality of parts (for example, the bearing members 18c) in such a manner as to stack the parts in a gravitational direction and supplying the parts to a predetermined position, includes:

a first abutment portion (for example, the abutment portion 71a) which first comes into contact with a succeeding part inserted into the guide from above in an inclined attitude;

a second abutment portion (for example, the abutment portion 71b or 71c) which comes into abutment with the succeeding part when a gravitational-center-side of the succeeding part falls to move downward about the first abutment portion and which supports the succeeding part in an orderly arranged state; and a first receiving portion (for example, the receiving portion 72a) and a second receiving portion (for example, the receiving portions 72b and 72c) with which a plurality of abutment portions provided on a lower-side part placed within the guide in an orderly arranged state come into abutment.

The first abutment portion and the first receiving portion as well as the second abutment portion and the second receiving portion are respectively disposed on straight lines parallel to a part arranging direction.

The part has an overlap portion (for example, the overlap portion 97b) to overlap the lower-side part in a direction perpendicular to the part arranging direction.

The part has a sliding portion (73, 83, 93) for sliding contact with another part, in a region different from any of the abutment locations and the receiving locations.

The part has a sliding portion (73, 83, 93) for sliding contact with another part, in a region different from any of the abutment portions and the receiving portions.

The part is a bearing member (18c) having a sliding portion (73) for rotatably supporting an electrophotographic photosensitive member (7).

The part is an end member (90) having a sliding portion (93) for rotatably supporting a developing roller (10d).

The end member has a sliding portion for sliding contact with a gear which transmits driving from a main body to a developer stirring member (10b).

A part supplying method of retaining a plurality of parts (for example, the bearing members 18c) in the state of being stacked in a guide (for example, the case 76) in the gravitational direction and supplying the plurality of parts to a predetermined position, includes;

a part inserting step (S1) of inserting a part into the guide from above in an attitude having a predetermined range of inclination with respect to an orderly arranged attitude;

a gravitational-direction positioning step (S2) of bringing the inserted part into abutment with a first abutment portion (for example, the abutment portion 71a) provided on a preceding part, and positioning the part in the gravitational direction;

an inclination correcting step (S3) of correcting an inclination of the inserted part to arrange the inserted part in a column, by allowing a center-of-gravity side of the inserted part to fall while moving downward about the first abutment portion, and bringing the center-of-gravity side into abutment with a second abutment portion (for example, 71b and 71c) provided on the preceding part; and an arranged-parts supplying step (S4) of supplying the arranged parts to a predetermined position in the same attitude.

As described above, in accordance with the invention, it is possible to improve the work efficiency of process cartridge assembly. In addition, it is possible to prevent decrease of performance of process cartridges caused by damage to cartridge parts due to the conveyance thereof from a production factory to an assembly line.

While the invention has been described with reference to the structure disclosed herein, it is not confined to the details set forth and this application is intended to cover such modifications or changes as may come within the purposes of the improvements or the scope of the following claims.

What is claimed is:

1. An end member of a developing member for rotatably supporting one end of a developing roller of a process cartridge detachable with respect to an image forming apparatus, comprising:

a sliding portion configured and positioned to rotatably support one end of the developing roller;

a plurality of receiving portions which are disposed at positions different from said sliding portion and are supported by an end member adjacent to the lower side of said end member when a plurality of end members are stacked in a vertical direction;

a plurality of abutment portions which are disposed at positions different from said sliding portion and support an end member adjacent to the upper side of said end member when a plurality of end members are stacked in the vertical direction,
wherein the distance between one of said abutment portions and a corresponding one of said receiving portions is substantially the same for any pair of one abutment portion and a corresponding receiving portion;

a first overlap portion that projects from an upper side of said end member and overlaps with a second overlap portion of the end member adjacent to the upper side of said end member when a plurality of end members are stacked in the vertical direction; and a second overlap portion that overlaps with a first overlap portion projecting from an upper side of the end member adjacent to the lower side of said end member when a plurality of end members are stacked in the vertical direction, wherein said sliding portion does not come into contact with the end member adjacent the upper side of said end member and the end member adjacent the lower side of said end member when a plurality of end members are stacked in the vertical direction.

* * * * *

UNITED STATES PATENT AND TRADEMARK OFFICE
CERTIFICATE OF CORRECTION

PATENT NO. : 7,079,787 B2  Page 1 of 1
APPLICATION NO. : 10/718703
DATED : July 18, 2006
INVENTOR(S) : Hiroki Ogino et al.

It is certified that error appears in the above-identified patent and that said Letters Patent is hereby corrected as shown below:

ON THE TITLE PAGE, AT ITEM (57), Abstract:
Line 3, "act" should read --acts--.

COLUMN 2:
Line 23, "includes;" should read --includes:--.

COLUMN 6:
Line 22, "11f" should read --11h--.
Line 23, "1d" should read --11d--.

COLUMN 8:
Line 32, "lid." should read --11d.--.
Line 55, "110i." should read --10i.--.

COLUMN 9:
Line 1, "lid" should read --11d--.
Line 32, "1d" should read --11d--.

COLUMN 12:
Line 28, "is" should read --has--.

COLUMN 18:
Line 22, "includes;" should read --includes:--.

Signed and Sealed this

Fifth Day of August, 2008

JON W. DUDAS
*Director of the United States Patent and Trademark Office*